US012186253B2

(12) United States Patent
Johnson et al.

(10) Patent No.: US 12,186,253 B2
(45) Date of Patent: Jan. 7, 2025

(54) TRAUMA GURNEY WITH ENHANCED PATIENT TRANSFER CAPABILITIES

(71) Applicant: UNIVERSITY OF UTAH RESEARCH FOUNDATION, Salt Lake City, UT (US)

(72) Inventors: Brandon Bruce Johnson, Bountiful, UT (US); Charles Craig Logan, Syracuse, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 56 days.

(21) Appl. No.: 17/578,368

(22) Filed: Jan. 18, 2022

(65) Prior Publication Data

US 2022/0226178 A1 Jul. 21, 2022

Related U.S. Application Data

(60) Provisional application No. 63/283,166, filed on Nov. 24, 2021, provisional application No. 63/139,063, filed on Jan. 19, 2021.

(51) Int. Cl.
*A61G 7/10* (2006.01)

(52) U.S. Cl.
CPC ........... *A61G 7/108* (2013.01); *A61G 7/1038* (2013.01); *A61G 7/1046* (2013.01)

(58) Field of Classification Search
CPC .... A61G 7/108; A61G 7/1038; A61G 7/1046; A61G 2210/50; A61G 7/1019;
(Continued)

(56) References Cited

U.S. PATENT DOCUMENTS 4,893,323 A 1/1990 Cook
4,912,787 A * 4/1990 Bradcovich .......... A61G 1/0275 5/601

(Continued)

FOREIGN PATENT DOCUMENTS

DE 102013223537 A1 3/2015

OTHER PUBLICATIONS

International Search Report and Written Opinion received for PCT Patent Application No. PCT/US2022/012947, mailed on Apr. 1, 2022, 21 pages.

*Primary Examiner* — David R Hare
*Assistant Examiner* — Madison Emanski
(74) *Attorney, Agent, or Firm* — Workman Nydegger

(57) ABSTRACT

A trauma gurney includes a base connected to a frame by a vertical adjustment mechanism. The base is configured that it can be maneuvered over a receiving table. The frame holds a detachable platform suitable for the positioning of a patient thereon. Actuation of the adjustment mechanism allows the frame to be lowered and the patient platform to be detached. The patient platform is configured to be non-interfering with various procedures such as MRI procedures so the patient platform can remain with the patient after the patient has been transferred without adverse effects to the procedures. The patient platform can also be reattached to the frame after it has been removed. The trauma gurney beneficially allows a patient to be transferred from the gurney to another surface, such as for imaging, without requiring a conventional lateral transfer. Similarly, the trauma gurney allows a patient to be transferred back to the gurney.

20 Claims, 18 Drawing Sheets

(58) Field of Classification Search

CPC .......... A61G 1/013; A61G 1/02; A61G 7/103; A61G 1/00; A61G 1/0212; A61G 7/005; A61G 7/08; A61G 13/06; A61G 13/02; A61G 7/1057; A61G 2203/80; A61G 1/0293; A61B 6/04; A61B 6/0442; A61B 5/704; A61B 6/0487; A61B 5/055; A61M 2209/082; B60P 1/00; Y10S 5/943

USPC .............. 5/601, 600, 611, 81.1 R, 86.1, 618, 5/81.1 HS, 507.1

See application file for complete search history.

(56) References Cited

U.S. PATENT DOCUMENTS

| | | | | |
|---|---|---|---|---|
| 5,490,297 | A | 2/1996 | Bradcovich et al. | |
| 6,854,140 | B2 | 2/2005 | Bartels et al. | |
| 7,395,563 | B2 | 7/2008 | Whitmore, III et al. | |
| 8,176,584 | B2 | 5/2012 | Hornbach et al. | |
| 8,359,683 | B2 | 1/2013 | Patterson et al. | |
| 8,561,226 | B1 * | 10/2013 | Barr .................... | A61G 7/0515<br>5/81.1 R |
| 8,813,277 | B2 | 8/2014 | Ahlman | |
| 9,192,534 | B2 | 11/2015 | Coppens et al. | |
| 9,815,439 | B2 * | 11/2017 | Lemire ................ | A61G 7/0509 |
| 11,039,758 | B2 | 6/2021 | Coppens et al. | |
| 2003/0213064 | A1 | 11/2003 | Johnson | |
| 2004/0131159 | A1 * | 7/2004 | McKenna ............ | A61B 6/0442<br>378/209 |
| 2006/0133580 | A1 * | 6/2006 | Vezina ................ | A61G 1/0287<br>378/177 |
| 2007/0124858 | A1 | 6/2007 | Ahlman | |
| 2010/0050343 | A1 | 3/2010 | Hornbach et al. | |
| 2011/0145991 | A1 | 6/2011 | Bridge et al. | |
| 2016/0296387 | A1 | 10/2016 | Schar | |

* cited by examiner

TRAUMA GURNEY WITH ENHANCED PATIENT TRANSFER CAPABILITIES

CROSS-REFERENCE TO RELATED APPLICATIONS

This application claims priority to and the benefit of U.S. Provisional Patent Application Ser. No. 63/283,166, filed Nov. 24, 2021 and titled "Trauma Gurney with Enhanced Patient Transfer Capabilities," and claims priority to and the benefit of U.S. Provisional Patent Application Ser. No. 63/139,063, filed Jan. 19, 2021 and titled "Trauma Gurney with Enhanced Patient Imaging Capability." Each of the foregoing applications is incorporated herein by this reference in its entirety.

BACKGROUND

This application relates to the field of patient transfer. Patients must sometimes be moved about a hospital in a gurney or other transport device because they are unable to transport themselves even small distances. For example, trauma patients often need to be moved from a gurney in order to be properly placed within an imaging machine (e.g., an MRI or CT machine). Problems may arise when it is necessary to move a patient from one surface to another. This process can be difficult for emergency personnel. For example, a patient may be unconscious and/or unable to assist in the movement and it may require multiple medical personnel to move the patient. Lateral transfers can be dangerous to both the patient and medical staff. For example, lateral transfers may risk further injury to fragile patients (such as patients with spinal trauma) or new injury to medical staff (through lifting and straining to move a patient to a new surface).

Additional issues arise when it is necessary to move patients for certain types of imaging. For example, it may be necessary to "log roll" a patient to her side in order to slide an imaging cassette directly under the patient for an x-ray or other type of imaging. Similar risks are associated with even small movements to the patient. Indeed, simple procedures, such as acquiring the patient's weight, can be difficult if the patient is unable to move to the corresponding equipment. Critical, life-saving time can be lost as medical staff labor to carefully move patients for diagnostic tests.

Some attempt to solve this issue by providing transfer-only gurneys. However, these gurneys do not fulfill the standard functions of a gurney, let alone the needs of a gurney in trauma settings. For example, these gurneys are unable to properly support a patient during intense medical treatment such as CPR and the like. Moreover, these transfer-only gurneys often cannot support the monitors and equipment that are necessary to treat the patient. Other solutions such as low-tinsel friction fabrics and sliding boards are not built into the gurney nor do they eliminate the need for a lateral transfer.

One example of a prior art transfer gurney is described in U.S. Pat. No. 8,813,277 to Ahlman The Ahlman gurney is intended to provide a single surface on which a patient remains during diagnosis, treatment, and convalescence. The Ahlman gurney includes a single surface platform connected to "cantilever arms" of a "cantilever transfer and transport frame" via a set of hooks attached to the upper and lower ends of the platform (i.e., by the patient's head and feet). In use, the platform is positioned over an intended receiving table and the cantilever arms are lowered until the platform contacts the table. Further lowering of the cantilever arms disengages them from the hooks of the platform so that the frame can be moved away from the platform.

Although the Ahlman gurney is directed to a similar problem of minimizing patient lateral transfers, it includes several limitations. For example, the "cantilever" design of the Ahlman gurney disrupts the overall balance of the gurney and makes it unsuitable for use in many trauma situations such as administration of CPR. That is, because the frame of the Ahlman gurney is significantly asymmetric, significant downward forces on the cantilever free end risk rocking the gurney or even detaching the platform from the frame. Moreover, because the platform is attached to the frame via hooks disposed at the upper and lower ends of the platform, the platform remains unsupported on the sides, further increasing the risk of unwanted platform movement or detachment from the frame, particularly during intense procedures such as CPR. Further, the Ahlman gurney does not directly support the center of mass of the patient, meaning that the portions of the frame contacting and supporting the platform is not aligned with the center of mass of the patient, further contributing to the overall instability of the gurney.

The Ahlman gurney design also makes it difficult to position the gurney in the Trendelenburg or reverse Trendelenburg position. That is, even if it the cantilever arms can be positioned with differential height to provide some amount of tilt to the platform, the reliance on hook supports makes it unlikely that an operator could safely put a patient in a full (e.g., up to about 30° or 40° from horizontal) Trendelenburg or reverse Trendelenburg position.

In addition, because the patient platform attaches to the cantilever arms via upwardly extending hooks, the platform sits at a depressed elevation relative to the cantilever arms. This makes it difficult to place equipment near the patient's head or feet, as is often desired in typical emergency situations. The use of hooks also undesirably increases the risk that personnel and/or other equipment will catch or snag against the hooks, particularly given the often busy and crowded hospital setting.

Further, because the hooks are attached to the platform of the Ahlman gurney, they must remain with the platform even after the platform is detached from the frame. This means that the hooks will be inserted into an imaging system (e.g., MRI or CT machine) along with the patient. Even if the hooks are made of a compatible material, they are still likely to cause unwanted imaging artifacts in the resulting images.

Moreover, the leg members of the Ahlman gurney frame are designed to extend laterally (i.e., perpendicular to the longitudinal length of the gurney from upper to lower end). This requires a side approach to transfer the patient to any intended surface. That is, the laterally extending leg members of the Ahlman gurney make it impossible to do a direct, front approach to position the platform over the intended transfer surface. Instead, the Ahlman gurney must be placed side by side with the intended transfer surface and then the gurney must be further positioned so that the platform is disposed above the intended transfer surface. This is a significant limitation given that most imaging system tables do not include special gaps to accommodate the laterally extending leg members. For example, standard MRI machines do not include gaps between the imaging scanner and the patient table that would accommodate the lateral leg member of the frame of the Ahlman gurney.

Another example of a prior art device is described in United States Patent Publication No. 2016/0296387 to Schar. The Schar device includes a stretcher detachably connected to a frame. The lower end of the stretcher is connected to the frame while the upper end remains unsupported in a cantilever manner The frame can be positioned over a receiving table and the stretcher can be detached from the frame.

The Schar device also includes several limitations, and is unsuitable for use as a standard trauma gurney. As with the Ahlman gurney, the stretcher portion of the Schar device is not adequately supported by the frame in a manner that would enable CPR or other intensive emergency procedures common in hospital settings. For example, significant downward forces placed on the stretcher portion, particularly toward the upper, unsupported end of the stretcher portion would tend to rock the stretcher in a "diving board" manner and could even risk unintentionally detaching the stretcher from the frame. Further, as with the Ahlman gurney, the Schar device does not directly support the center of mass of the patient, meaning that the portion of the frame contacting and supporting the stretcher is not aligned with the center of mass of the patient, further contributing to the overall instability of the Schar device.

In addition, because the stretcher portion of the Schar device is only supported on one end, the stretcher is limited in how it can be positioned. For example, the Schar device cannot provide Trendelenburg or reverse Trendelenburg positions, nor can it bend to provide Fowler's position (low or high).

Moreover, the Schar device does not include a robust mechanism for adjusting the height of the stretcher portion relative to the frame. In use, the Schar device is positioned so the stretcher is over a therapy table and then the therapy table is raised to meet the stretcher. This design reduces the versatility of the device and limits practical use to receiving tables specifically designed to work with the device. Many receiving tables do not have any height adjustment capabilities and would not work with the Schar device.

Accordingly, there are a number of disadvantages with conventional trauma gurneys and transfer methods, and the field would benefit in particular from improvements that enable more effective lateral transfers of patients.

SUMMARY

The disclosed embodiments include a gurney (which may also be referred to herein as a "patient transport device") configured to enable patient transfer without requiring lateral transfer. Such gurneys may also be referred to herein as "trauma gurneys," though the term "trauma" is not intended to limit the potential uses or the beneficial features of the embodiments described herein. The gurney has a base with two longitudinally extending base members. The base is connected to a frame by way of an adjustment mechanism. The frame is u-shaped such that it has two longitudinally extending arms connected by a laterally extending portion. The two arms extend substantially parallel to the base members of the base. The adjustment mechanism is configured to adjust the height of the frame relative to the base. Finally, the gurney includes a patient platform detachably supported and/or connected to the frame and configured to detach from the frame.

The disclosed embodiments also include methods of transferring a patient using a trauma gurney. The trauma gurney includes a base that is connected to a frame by an adjustment mechanism. The frame holds a removeable patient platform. The method includes positioning the patient on the patient platform followed by adjusting the frame to a height which is greater than a height of the receiving table. After which, the method includes moving the trauma gurney to a position where the patient platform is above the receiving table and the base is positioned on either side of the receiving table in a longitudinal direction. The method includes adjusting the frame to a height such that the patient support comes in contact with the receiving table and detaches from the patient support. Finally, the method includes moving the frame and base away from the receiving table such that the patient support remains on the receiving table.

Embodiments described herein provide one or more improvements to the state of the art. For example, a trauma gurney as described herein can beneficially enable a front approach to an imaging system table or other intended patient transfer target. Once the patient platform is positioned over the intended receiving area, the portion of the frame supporting the patient platform can be lowered to bring the patient and the platform into contact with the receiving area. The frame and the remainder of the gurney can then be moved from the platform. To transfer the patient again, the process is reversed such that the patient platform is again supported by the gurney.

The gurney provides these beneficial functions while also being capable of standard trauma gurney functions. For example, the gurney has a structure that enables CPR and other intensive procedures common in hospital settings without risk of unintentionally moving or detaching the patient platform. The patient platform is also supported by the frame in a manner that directly supports the patient's center of mass. In other words, the portion of the frame contacting and supporting the patient platform is also coincident with the portion of the platform where the patient's center of mass (typically near the navel or slightly inferior of the navel) is expected to be when a patient is positioned thereon. Such features further contribute to the stability of the device.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

BRIEF DESCRIPTION OF THE DRAWINGS

Various objects, features, characteristics, and advantages of the invention will become apparent and more readily appreciated from the following description of the embodiments, taken in conjunction with the accompanying drawings and the appended claims, all of which form a part of this specification. In the Drawings, like reference numerals may be utilized to designate corresponding or similar parts in the various Figures, and the various elements depicted are not necessarily drawn to scale, wherein:

DETAILED DESCRIPTION

Example Benefits of Disclosed Trauma Gurneys

Figure 1:
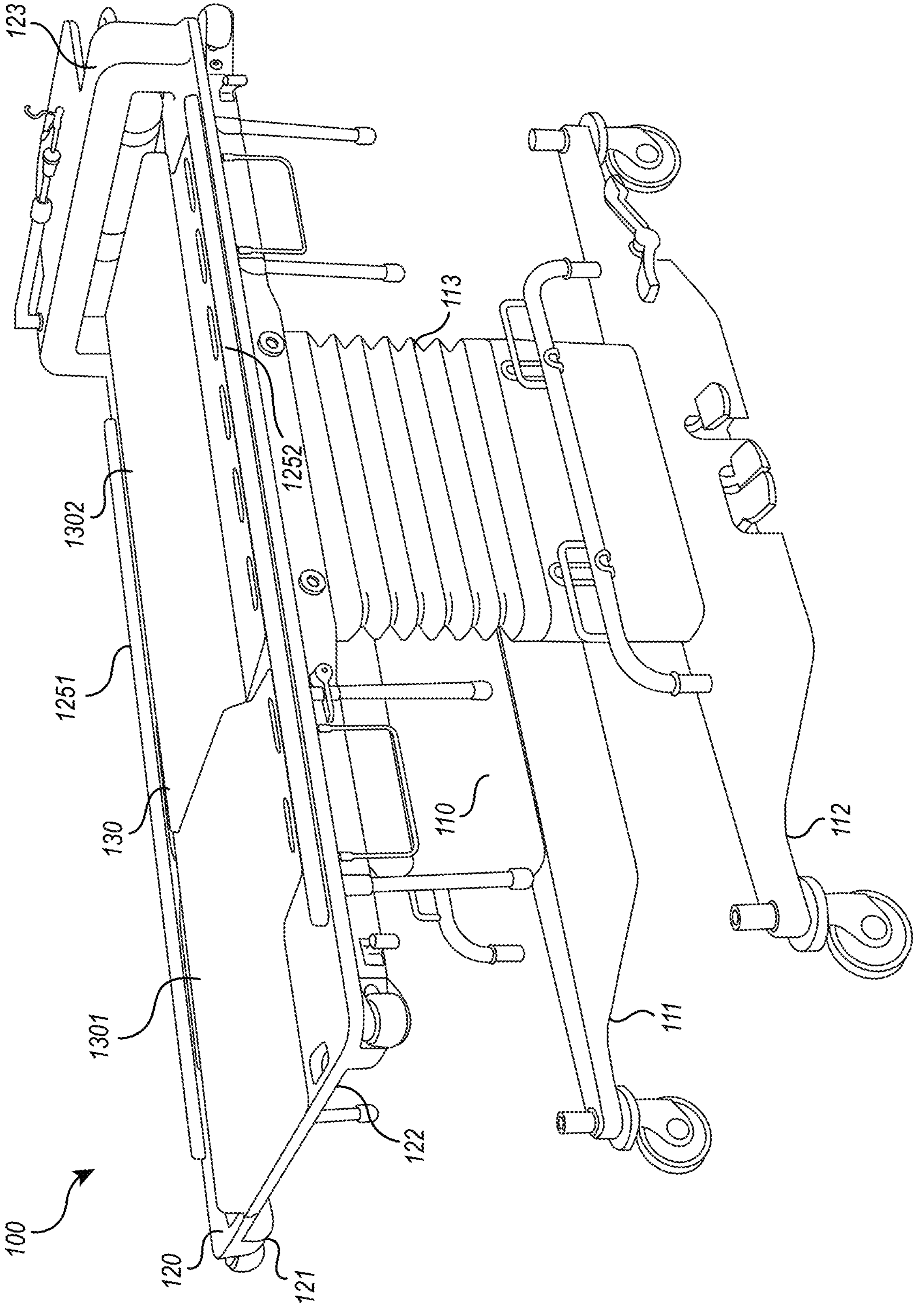
FIGS. 1-3 illustrate an exemplary trauma gurney with a patient platform, a frame, and a base.

When trauma patients arrive at the hospital, they are typically moved several times laterally from a gurney to other hospital equipment. This not only risks further injury and delayed diagnosis and/or treatment to the patient, but also exposes medical staff to injury and/or liability. Eliminating the need to laterally transfer patients until possible injuries are diagnosed and transfer is deemed safer and can thus provide several benefits to the technical field.

In one embodiment, a specialized gurney enables care and procedures to be performed without laterally moving patients positioned thereon. The gurney includes a detachable platform on which the patient may be positioned. The platform is designed to detach from the gurney frame to allow the patient to be left in a desired place with the patient platform while the gurney frame is moved away from the patient. The gurney base has space between the members (i.e., legs/supports) of the base so that the gurney can be pushed over a receiving table (such as OR, MRI, CT, and/or x-ray table/bed) and, thus, straddle the receiving table as the patient is lowered to the surface. For example, the base supports of the trauma gurney are designed to run substantially parallel with standard imaging tables and/or other hospital/OR patient receiving equipment.

The support can then be detached from the gurney frame once the patient is navigated to the desired position. After desired imaging and/or other procedures are performed, the support may then be re-attached to the gurney frame. This avoids or minimizes the need to laterally transfer the patient manually until diagnosis, emergent procedures, and/or patient stabilization is achieved. This allows imaging (e.g., MRI, CT, OR, x-ray) and/or other procedures to be performed without needing to laterally slide, lift, hoist, or otherwise move the patient.

In some embodiments, the gurney includes tracks underneath the patient support that allow positioning of x-ray cassettes and/or grids under the patient. Thus, equipment can be placed under the patient for standard emergent imaging without requiring "log rolling" or otherwise moving the patient. In some embodiments, an integrated scale may also be incorporated to provide accurate patient body weight in order to speed diagnostic time and determination of medication doses to be administered.

The gurney is also structurally configured to be able to perform the functions of a standard gurney as needed. For example, the gurney is capable of supporting and withstanding forces associated with administration of CPR to patients lying thereon. This is a result of the overall balanced structure of the device. For example, the frame of the gurney is designed to support the detachable platform on both sides and at regions coinciding with the patient's center of mass. The platform is also supported along an effective proportion of its perimeter. These features enable standard trauma gurney usage, including the ability to move between standard patient positions, Trendelenburg, reverse Trendelenburg, and Fowler's positions as desired. The gurney is also preferably designed and engineered to be compatible with the MRI environment.

The trauma gurney disclosed herein may also be used as a standard gurney and/or transport device, and may be housed in ICU or urgent care settings, for example, to speed up care/diagnosis if patient condition were to change and need services that require a lateral transfer.

Overview of an Example Trauma Gurney

The embodiments will now be described with respect to the Figures. FIG. 1 illustrates an exemplary trauma gurney 100 that has a base 110, a frame 120, and a patient platform 130 supported by the frame 120. The base 110 includes base members 111, 112 that extend longitudinally (i.e., along the long axis of the gurney), with space between them that is sufficient to allow the gurney to be positioned over a receiving table/bed for medical equipment (e.g., MRI machine) or other intended patient receiving area. The base 110 is connected to the frame 120 by way of an adjustment mechanism 113 that is adjustable in height.

The frame 120 includes two arms 121, 122 that extend in a longitudinal axis of the trauma gurney 100. The illustrated frame 120 also includes a laterally extending portion 123 at the lower end (i.e., near the patient's feet) that connects the arms 121, 122. The arms 121, 122 extend in a direction parallel to a longitudinal axis of the gurney 100 and are also spaced apart. The arms 121, 122 enable the frame 120 to hold the patient platform 130 between each arm 121, 122. The frame 120 contacts the patient platform 130 on the side edges of the patient platform 130. In this manner, the patient platform 130 can be downwardly placed on a receiving table and the frame 120 can be detached from the patient platform 130. The frame 120 can either be lowered away from the patient platform 130 or the patient platform 130 may be lifted upwards away from the frame. Such functionality will be described in greater detail below.

Figure 2:
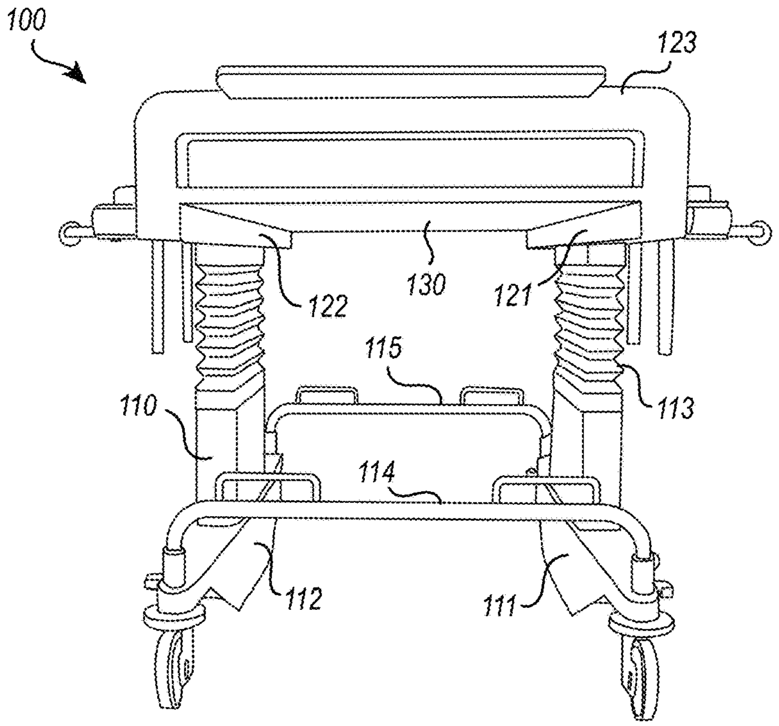
Figure 3:
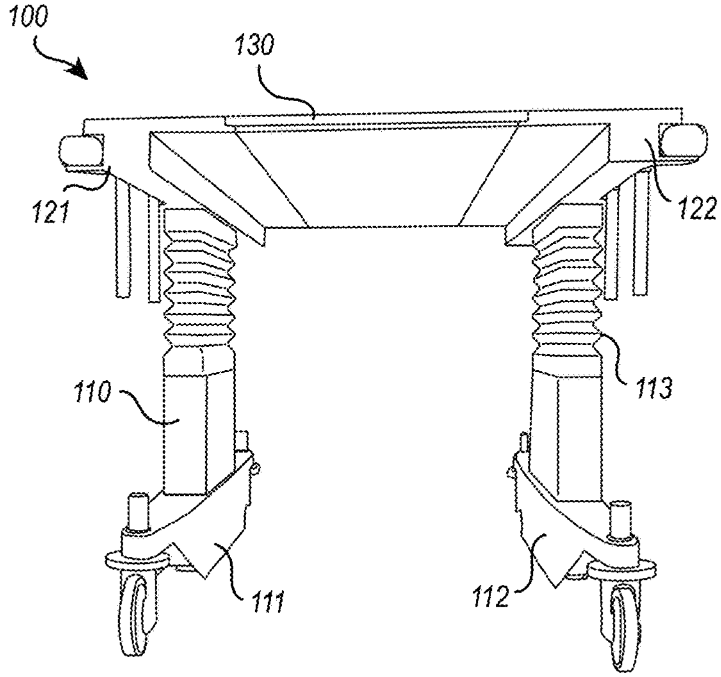

FIGS. 2 and 3 show additional views of the trauma gurney 100. FIG. 2 illustrates the rearward view of the trauma gurney 100. The rearward side is the side of the gurney nearest to the laterally extending portion 123. In typical use, the rearward side is the portion of the trauma gurney 100 that is nearest to the patient's feet. FIG. 2 also illustrates optional lateral base members 114, 115 extending along a lateral axis of the trauma gurney 100. The lateral base members 114, 115 are detachably connected to the base members 111, 112 or otherwise configured to fold and/or disengage to provide clearance between the base members 111, 112 when desired. The lateral base members 114, 115 provide additional stability to the trauma gurney 100. Additional stability is beneficial to help the base members 111, 112 to withstand stresses. For example, stresses may include transportation stresses, impact stresses, or stresses related to treatment of the patient (e.g., CPR). The lateral base members 114, 115 are a crossmember that provide additional support by attaching to the opposing, parallel base members 111, 112. The lateral base members 114, 115 are removeable so that the trauma gurney 100 can be maneuvered over a receiving table. FIG. 3, for example, illustrates the trauma gurney 100 with the lateral base members 114, 115 removed. In at least some implementations, the lateral base members 114, 115 are optional, and the base 110 and base members 111, 112 provide sufficient stability without the lateral base members 114, 115.

FIG. 3 illustrates a front/forward side of the trauma gurney 100. The forward side is the side of the gurney that is furthest away from the laterally extending portion 123. In typical use, the forward side is the portion of the trauma gurney 100 that is nearest to the patient's head. The view in FIG. 3 clearly illustrates the space provided between the base members 111, 112. The base members 111, 112 run longitudinally parallel to one another and are on opposing sides of the trauma gurney 100, defining a space between the base members 111, 112. Because of the space between the base members 111, 112, the gurney 100 can be maneuvered, in a front approach fashion, over a receiving table that has a width less than the width between the base members 111, 112. Thus, the space provided between the base members 111, 112 allows the trauma gurney 100 to straddle over the receiving table.

Figure 4:
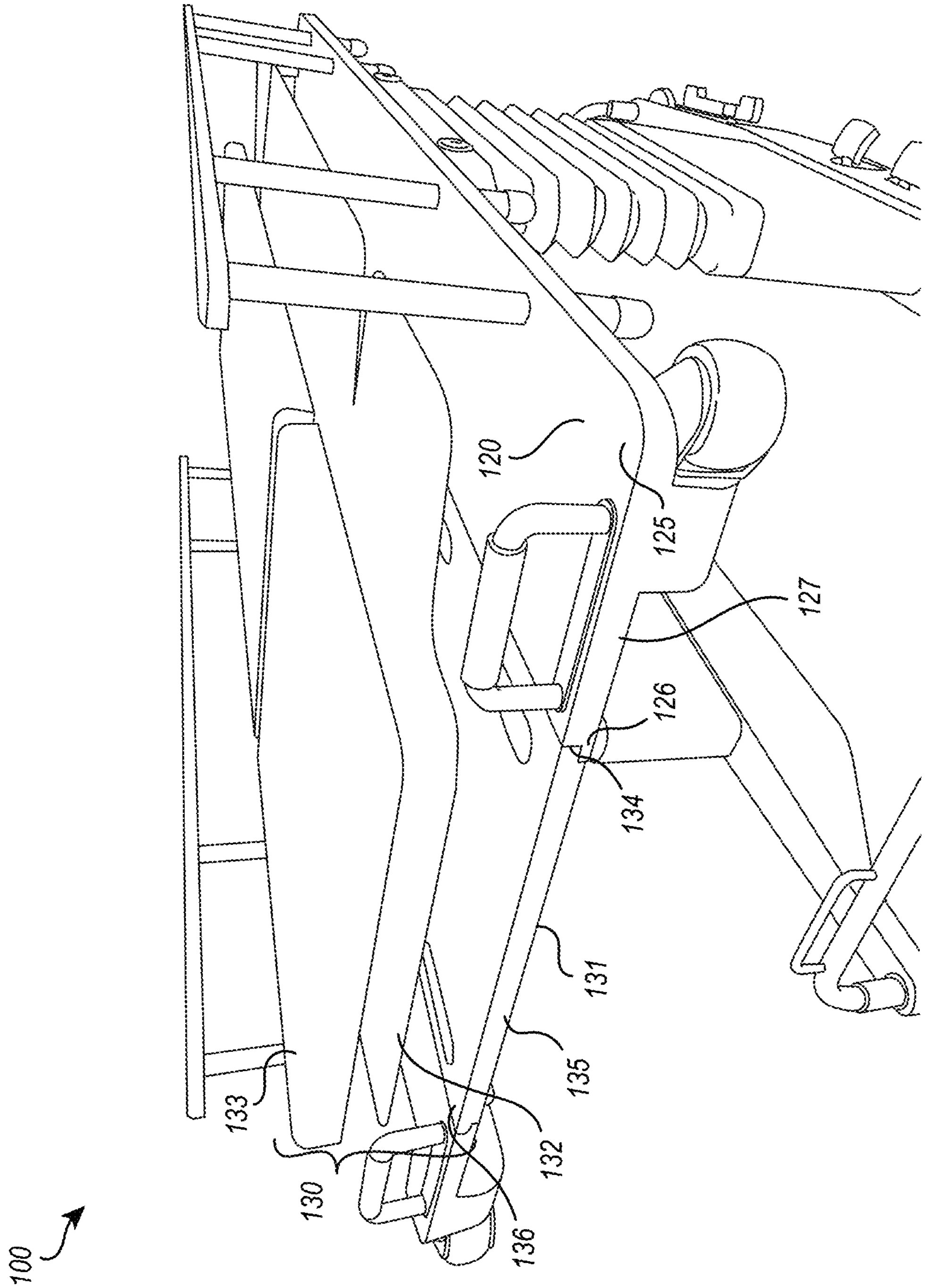
FIG. 4 illustrates a trauma gurney with an exploded view of a patient platform.

FIG. 4 illustrates some components and features of the attachment between the patient platform 130 and the frame 120, showing an exploded view of the patient platform 130. The patient platform 130 may include a patient support 131, a shield 132, and a pad 133. The patient support 131 is in contact with and supported by the frame 120. In the illustrated embodiment, the patient support 131 has a mating channel 134 along the longitudinal edges and downward side 135 of the patient support 131.

The mating channel 134 may extend the full length of the patient support 131 in a longitudinal direction. Alternatively, the mating channel 134 may also run only a portion of the length of the patient support 131. In some instances, the mating channel 134 may run along one or more lateral edges of the patient support 131. The mating channel 134 is designed to fit with a mating ledge 126 on the frame 120. The mating ledge 126 is located on the inner edge of each arm 121, 122 of the frame 120. In this manner, the frame 120 supports the platform 130. In some embodiments, the support surface 136 of the patient support 131 is flush with the support surface 125 of the frame while the patient support 131 is being supported by the frame 120. In some embodiments, the patient support 131 omits a distinct mating channel 134 yet maintains an overall width sufficient to be supported by the mating ledge 126 of the frame 120.

The platform 130 is removably attached to the frame 120. In the illustrated embodiment, the mating channel 134 of the platform is supported by the ledge 126 of the frame 120. Additionally, or alternatively, the platform 130 may attach mechanically to the frame 120 as downward forces are applied to the patient platform 130 which force the platform 130 into the frame 120. For example, the platform 130 may also attach with interlocking edges, serrations, friction materials, a friction fit, or the like. The attachment between the channel 134 and the mating ledge 126 enable the frame to be removable from underneath the patient platform 130 after the platform 130 has been transferred to the receiving table. This is done by lowering the frame 120 below the resting position of the patient platform 130 (e.g., the height of the patient platform 130 on the receiving table), or alternatively by raising the patient platform 130 above the frame 120. This will be described further below.

In some embodiments, the surface side 136 of the patient support 131 is flush with the surface side 125 of the frame when the platform 130 is supported by the frame 120. In addition, the reverse/downward side 135 of the platform 130 may be flush with the reverse side 127 of the frame 120.

Example Trauma Gurney Dimensions

Figure 5:
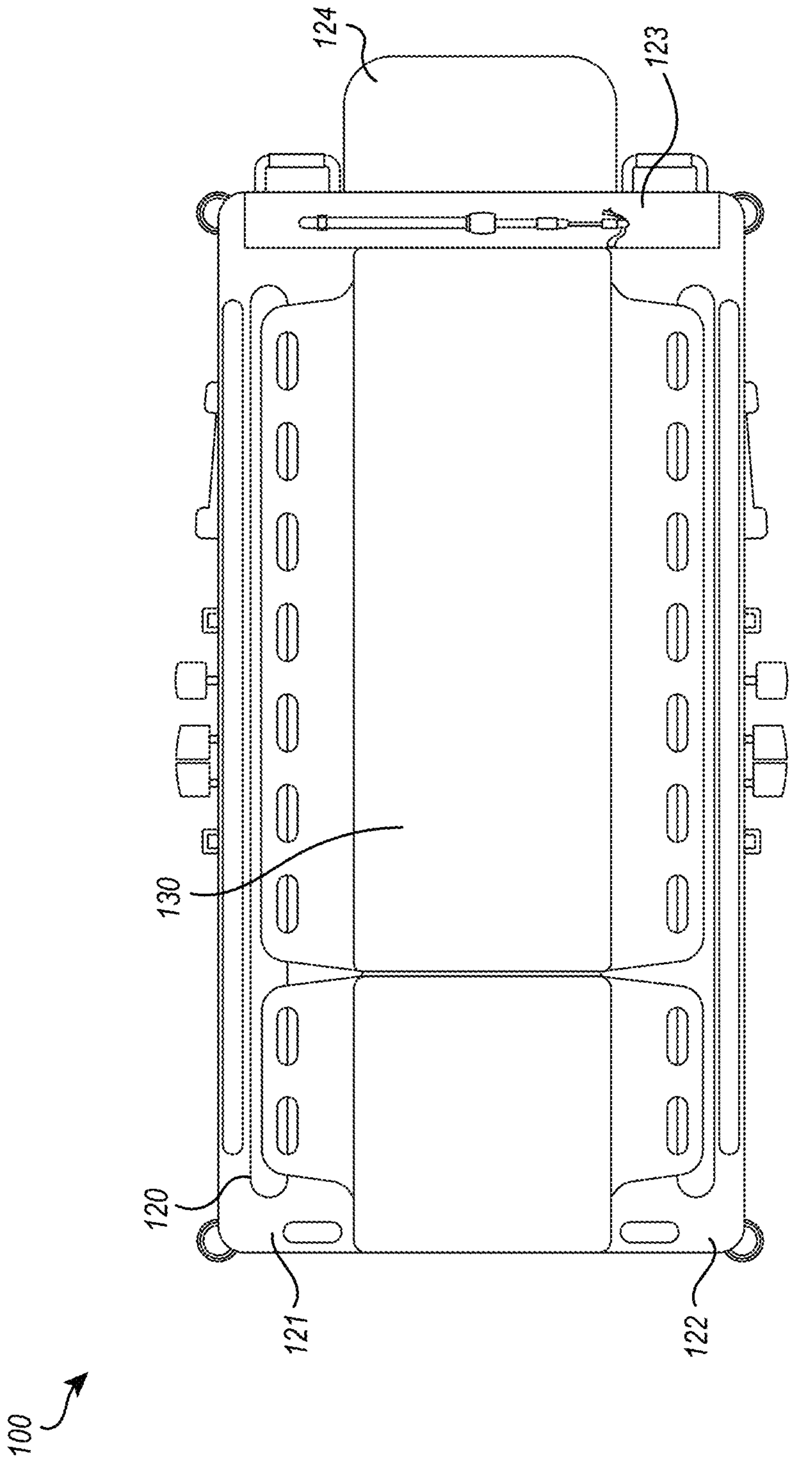
FIGS. 5-7 illustrate various possible dimensions of a trauma gurney.
Figure 6:
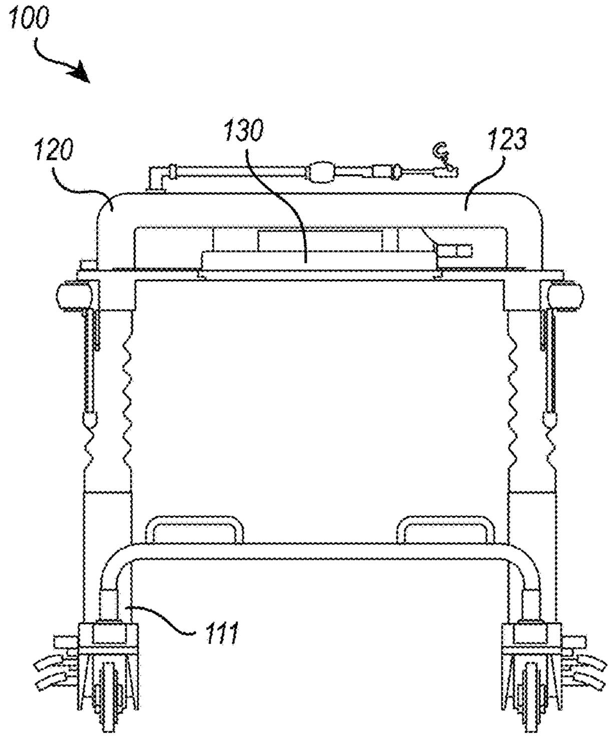
Figure 7:
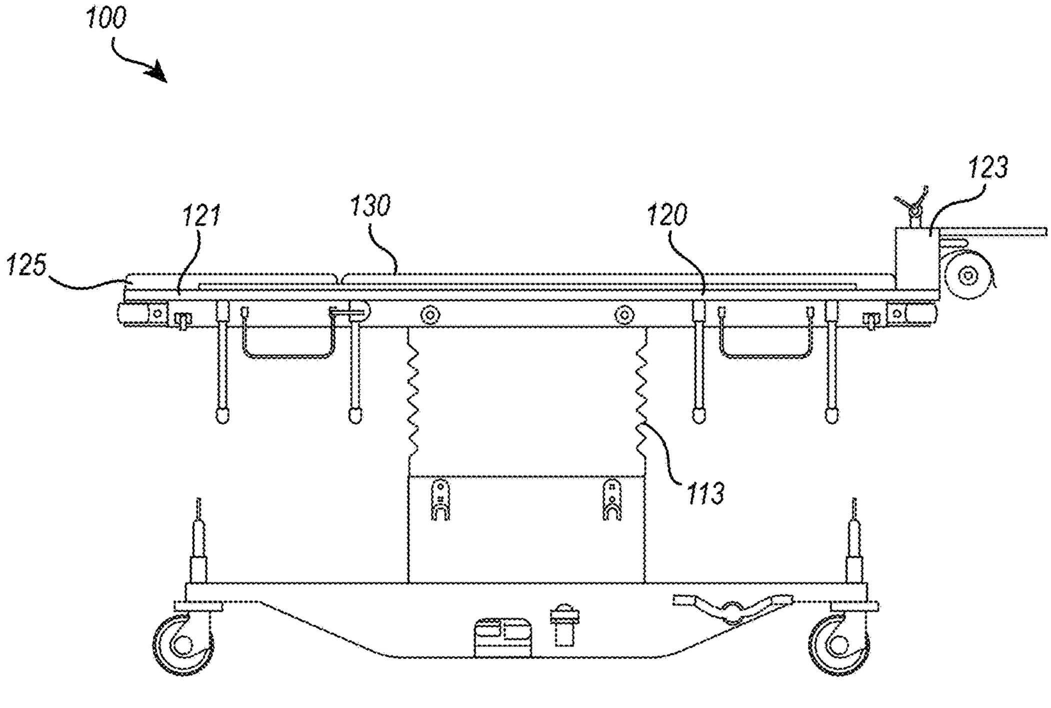

FIGS. 5-7 illustrate various perspectives and exemplary, non-limiting dimensions of the trauma gurney. Dimensions preferably meet the US national specifications of door widths and room size for hospital/ICU settings. FIG. 5 illustrates a top-down view of the gurney 100. Here, the u-shape of the frame 120 can be seen clearly with two longitudinally extending arms 121, 122 and one laterally extending portion 123 that connects the arms 121, 122 on the rearward side of the trauma gurney 100. The laterally extending portion 123 may also include an equipment platform 124 that can be used for supporting monitors and/or other equipment. In some embodiments, the laterally extending portion 123 is omitted. For example, the frame 120 may include the longitudinally extending arms 121, 122 without a lateral connection.

FIG. 5 illustrates the overall width of the frame, which is the distance from one edge of the frame 120 to an opposing edge in a lateral direction. In some instances, the overall width may be 35-55 inches, or more preferably 40-50 inches, or even more preferably 43-45 inches, and most preferably about 44 inches. The patient platform 130 also has a bed width which is the distance of the patient support 131 from one edge to an opposing edge in a lateral direction. The bed width of the patient platform 130 may be about 10-30 inches, but more preferably 15-25 inches, or even more preferably 19-21 inches, and most preferably about 20 inches.

FIG. 6 illustrates a view of the trauma gurney 100 that is similar to the rear view illustrated in FIG. 2. Here, the clearance dimensions of the trauma gurney 100 can be seen. The max clear span is the distance between the inner sides of the two base members 111, 112 in a lateral direction. The max clear span represents the maximum width that the trauma gurney 100 can functionally span. In some instances, the max clear span is about 15-45 inches, or about 20-40 inches, or about 25-35 inches, or about 30-32 inches. The max clear height is the vertical distance from the floor to the bottom side of the platform 130. In some instances, the max clear height is about 20-50 inches, or about 30-40 inches, or about 36-39 inches.

FIG. 7 illustrates a full length along a longitudinal axis of the trauma gurney 100. The overall length of the table is the distance along a longitudinal axis of the trauma gurney 100 from the end of the longitudinally extending arm 121 or 122 to the end of the monitor platform 124. In some instances, the overall length is about 70-110 inches, or about 90-100 inches, or about 93-95 inches. The patient platform 130 also has a length, which is the distance from one end to the other along the longitudinal axis of the trauma gurney 100. In some instances, the platform length is about 60-90 inches, or about 70-85 inches, or about 77-79 inches. Finally, the trauma gurney also has a table height, which is the height from the floor to the support surface 125 of the frame 120 which is a side of the frame where the patient is in contact with the trauma gurney 100. Because the frame is adjustable in a height direction (due to the adjustment mechanism 113) the table height will be a range from a minimum height to a maximum height. In some instances, the table height range is about 25-55 inches, or about 30-50 inches, or about 35-43 inches.

Additional Base Details

Figure 8:
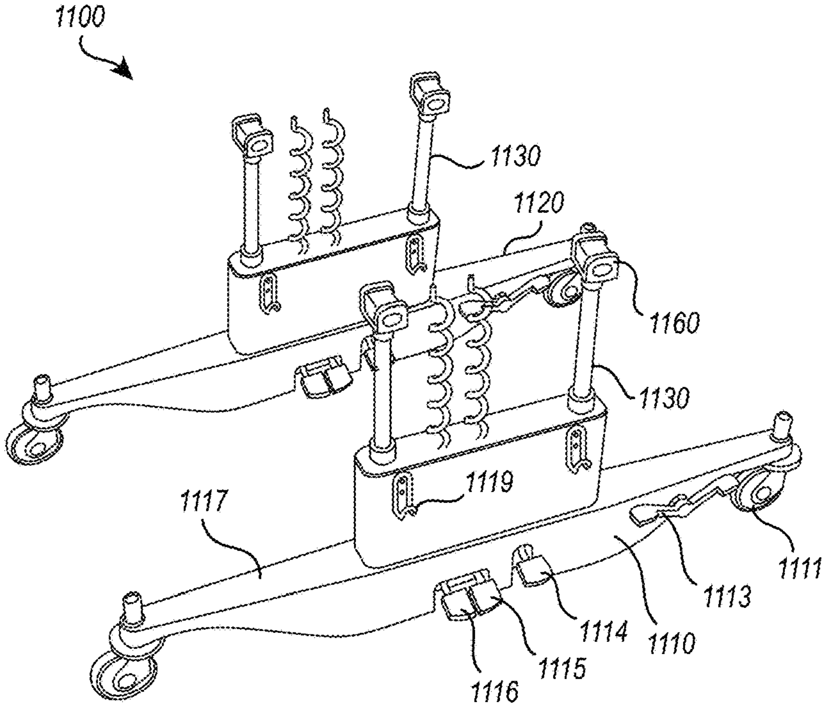
FIG. 8 illustrates a base of a trauma gurney including base members and an adjustment mechanism.
Figure 9:
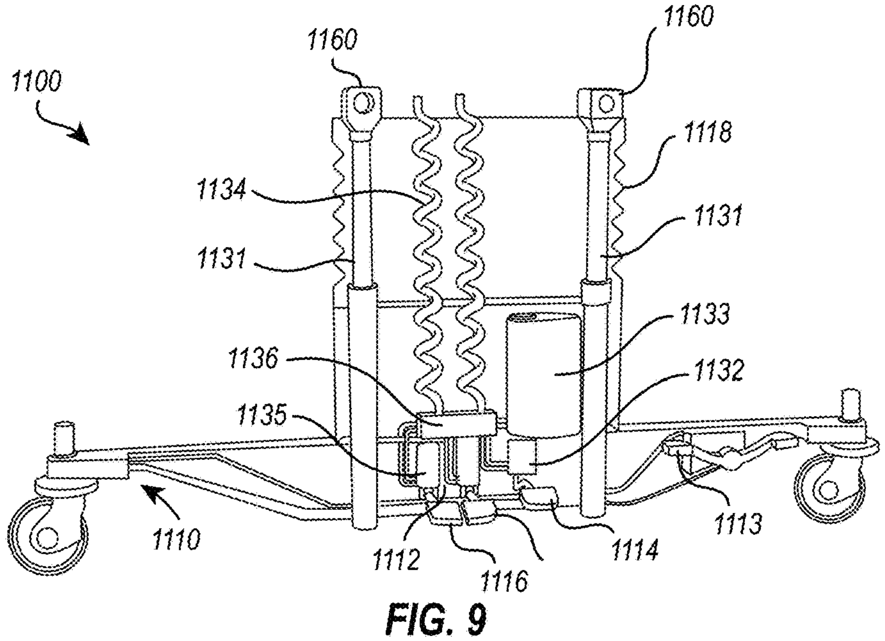
FIG. 9 illustrates a cutaway drawing of a base which illustrates various components of the base and the adjustment mechanism.
Figure 10:
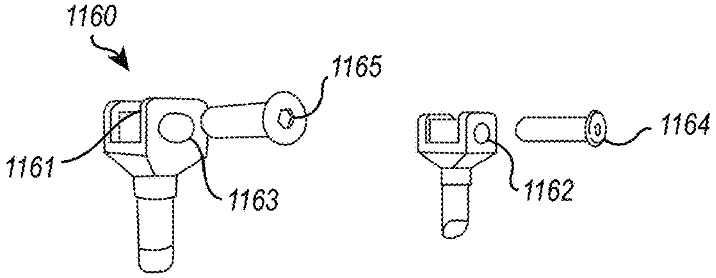
FIG. 10 illustrates attachment members that attach the base to the frame of a trauma gurney.

Discussion will now be turned to the various components of the base 1100 illustrated in FIGS. 8-10. The base 1100 of FIGS. 8-9 generally corresponds to the base 110 of FIGS. 1-7, and the following features are applicable to the base 110. The base 1100 may be constructed from a weldment with standard tubing. Alternatively, the base 1100 may be constructed from a stamping. As described above, the base 1100 includes one or more base members 1110, 1120. The base members 1110, 1120 are arranged so that the trauma gurney can be pushed over a receiving table. For example, the base members 1110, 1120 are spaced apart and may be aligned substantially parallel to each other along the longitudinal axis of the trauma gurney 100 (i.e., the longest axis of the trauma gurney 100). The base 1100 may also include an adjustment mechanism 1130, attachment members 1160, a cover 1117, and lateral base members 114, 115 (see FIG. 2).

The base members 1110, 1120 include rails that support the various components of the base members 1110, 1120 and the adjustment mechanism 1130. The base members may include wheels 1111, a braking system, a caster control system 1112, and control pedals 1113, 1114, 1115, 1116. The base members 1110, 1120 may also house various components of the adjustment mechanism 1130, which will be discussed with reference to FIG. 11 below. The caster control system 1112 is used to keep the wheel alignment in the direction of travel. This can be accomplished by using standard caster control systems such as hydraulic or mechanical caster systems. The caster control system may include casters or a caster control lever 1113. The control pedals 1114, 1115, 1116 may be used to control various aspects of the adjustment mechanism 1130.

The adjustment mechanism 1130 is a mechanism used to move the frame 120 in a height direction (e.g., vertically up and down) with respect to the base 110. The adjustment mechanism may be, for example, mechanical, hydraulic, electric, or combination thereof. FIG. 9 shows various components that may be used in a hydraulic adjustment mechanism 1130. For example, the adjustment mechanism 1130 may include pistons 1131 that are mounted rigidly to the base members. The rigid mount of the pistons 1131 enables forces that are applied to the frame 120 to transfer down to the base members 1110, 1120. In this manner, a user can push the frame 120 and the force will cause the base members 1110, 1120 to move in the direction of the force. In addition, by rigidly securing the pistons 1131 to the base members 1110, 1120, the trauma gurney has increased stability. The pistons 1131 may be mounted to the base members 1110, 1120 with a side mount, end mount, sleeve, or the like.

The illustrated adjustment mechanism 1130 also includes a pump 1132. The pump 1132 may be controlled by a pedal 1114. For example, hydraulic pressure may be added by way of a foot pump with pedal 1114. The pump 1132 may also be a hydraulic ram with a cartridge design that has a smaller inner hydraulic ram and a heavy outer sleeve. A hydraulic ram is beneficial to decrease the size of the pump and use less hydraulic fluid. The adjustment mechanism 1130 may also include a fluid accumulator tank 1133, hydraulic lines 1134 and fittings. The hydraulic lines 1134 are used to supply and return fluid to a proportioning valve that is located in or on the frame 120. The lines 1134 may be helical, expanding lines. The proportioning valve ensures that the hydraulic adjustment mechanism 1130 located on a first base member 1110 is in communication with the hydraulic adjustment mechanism 1130 on the second base member 1120. In this manner, the adjustment mechanism 1130 located on each base member 1110, 1120 will adjust the height of the frame 120 together. This feature enables the adjustment mechanism 1130 to make the same adjustments to both the first base member 1110 and the second base member 1120.

The adjustment mechanism 1130 has various control valves 1135 that correspond to pedals 1115, 1116. Each control valve 1135 controls either the forward piston 1131 or the rearward pistons 1131. Each pedal 1115, 1116 corresponds to a valve 1135 to control either the forward or rearward pistons 1131. In this manner, a user can control the forward or rearward pistons 1131 individually to adjust the height or tilt of the frame 1200. The adjustment mechanism 1130 also includes one or more manifolds 1136 connected to each of the valves 1135 on a base member 1110, 1120. Finally, the adjustment mechanism 1130 may include a support guide for attachment of the various components of the adjustment mechanism 1130 (the valves, accumulator, guidelines, etc.).

The adjustment mechanism is preferably made from non-magnetic and non-interfering materials. For example, they may be constructed from Austenitic steels such as AASI 304 and AISI 316. Fittings and valves may be made from stainless steel or the like. Alternatively, the fittings and valves may have stainless steel bodies while internal components are made from brass, bronze, or the like. Low-stress components may be made with materials such as aluminum and glass-filled nylon, carbon fiber, Kevlar, ABS, and urethanes.

The illustrated adjustment mechanism 1130 is able to raise and lower the frame 1200 in the following manner Hydraulic pressure from the pump 1132 is fed to the central manifold 1136. Afterward, pressure is fed through the hydraulic lines 1134 to the proportioning valve (not illustrated) located in the frame 1200. Once the pressure is equalized on both base members 1110, 1120 of the base 1100, the pressure is fed to the pistons 1131. The height of the piston 1131 (and thereby the height of the frame 1200) is controlled by draining and adding fluid to the respective pistons 1131. The frame 1200 can be adjusted into a tilt by controlling a different the pressure in the frontward and rearward pistons 1131. In this manner, the adjustment mechanism 1130 can control the height and tilt of the frame as will be shown and described further with respect to FIGS. 20A and 20B.

FIG. 10 illustrates an exemplary attachment member 1160 that may be used to attach the adjustment mechanism 1130 to the frame 120. In one embodiment, the attachment members 1160 are clevis fasteners 1161 attached to the top of the hydraulic pistons 1131. The clevis fasteners 1161 may have broad, flat, and precision-machined faces that fit into a channel on the reverse side 1217, 1227 of the frame 1200 (shown in FIGS. 13-14). In some instances, the width of the clevis 1161 face is about 1-5 inches, but more preferably 2-4 inches, or even more preferably 2.5-3.5 inches, and most preferably 3 inches. Each clevis 1161 includes an axle bore 1162, 1163 and a pivot axle 1164, 1165 that fits through the axle bore 1162, 1163. The devises 1161 located on the forward end (i.e., the side furthest away from the laterally extending portion 1230), may have an elongated bore 1163. The elongated bore 1163 is a bore that is elongated in the forward and rearward direction to allow the pivot axle 1165 to move slightly forward and rearward within the elongated bore 1163. In this manner, the attachment member 1160 will accommodate a tilt of the frame 1200 because the pivot axle 1165 can move forward and rearward to accommodate different angles of the frame 1200.

The base member may also include a cover 1117. The cover may, for example, be a blow molded shroud that improves both the aesthetics and ease of sanitization of the trauma gurney 100. Part of the cover 1118 may be made of a different material or design. For example, a different type of cover 1117 may be needed for flexible or moving parts. In one instance, the part of the cover 1118 that covers the adjustment mechanism may be a flexible shroud to accommodate the movement of the adjustment mechanism 1130. For example, part of the cover 1118 may include a flexible shroud with an accordion design as shown in FIG. 9.

Finally, the base 1100 may include lateral base members 114, 115 as was discussed above with reference to FIGS. 2 and 3. The lateral base members 114, 115 attach to the base member 1110, 1120 horizontally to connect the base members 1110, 1120 together. The lateral base members 114, 115 are removeable. Hooks 1119 and/or other suitable attachment features may be provided on the base 1100 for storing the lateral base member 114, 115 when they are not in use.

Additional Frame Details

Discussion will now be turned to the various components of the frame 1200 shown in FIGS. 11-14. The frame 1200 illustrated in FIGS. 11-14 generally corresponds to the frame 120 of FIGS. 1-7, and the following features may be included in frame 120. The frame 1200 provides stability for transporting and treating the patient. Thus, the frame 1200 is designed to avoid weaknesses due to stress concentration and the frame 1200 has high flexural and torsional strength. That is, the frame 1200 is preferably rigid in the longitudinal and lateral axes to provide stability to the trauma gurney 100. In one embodiment, frame 1200 may be a monocoque structure. In another embodiment, the frame 1200 may be constructed from a torsion-box weldment. The frame may be constructed from materials that have strength, rigidity, and will not interfere with medical equipment (i.e., sufficiently non-magnetic to avoid interference with an MRI). For example, the frame 1200 may be constructed from Austenitic stainless steels such as AISI 304 and AISI 316. Alternatively, the frame 1200 may be constructed from carbon-fiber with stainless steel inserts in areas of stress concentration.

In the illustrated embodiment, the main structure of the frame 1200 is a u-shaped design with two longitudinally extending arms 1210, 1220 that are connected by one laterally extending portion 1230. This shape is beneficial because there is no frame structure near forward side where the patient's head is positioned. Thus, the frame 1200 does not obstruct the relevant area and medical personal have effective access to the patient's head. The u-shaped frame 1200 is also beneficial because it allows the patient platform 1300 to detach from the frame 1200 so that the frame 1200 can be maneuvered away from the patient when the patient is positioned on a receiving table.

In the illustrated embodiment, each of the arms 1210, 1220 includes a mating ledge 1260 to hold the patient platform 1300. The mating ledge 1260 is located on the inner edge of each arm 1210, 1220. The mating ledge 1260 may also extend along the laterally extending portion 1230. The mating ledge 1260 supports the patient platform 1300 along the permitter of the patient platform 1300. In some instances, the mating ledge 1260 is in contact with only the two longest edges of the patient platform 1300, for example the longitudinally extending edges of the patient platform 1300. In other instances, the mating ledge 1260 is in contact with two longitudinally extending edges and one laterally extending edge of the patient platform 1300.

The frame 1200 contacts the perimeter edge 1305 of the patient platform 1300 (e.g., via the mating ledge 1260). In some instances, the frame 1200 supports at least 20% of the patient platform perimeter edge 1305, at least 30% of the patient platform perimeter edge 1305, at least 40% of the patient platform perimeter edge 1305, at least 50% of the patient platform perimeter edge 1305, at least 60% of the patient platform perimeter edge 1305, at least 70% of the patient platform perimeter edge 1305, or at least about 75% of the patient platform perimeter edge 1305. Some embodiments are configured to include a range of such contact percentages with endpoints defined by any two of the foregoing values.

In some embodiments, the frame 1200 contacts and supports at least 20%, or at least 30%, or at least 40%, or at least 50%, or at least 60%, or at least 70%, or at least 80%, or at least 90% of a perimeter edge 1305 along at least one longitudinally extending side of the patient platform 1300, or along both longitudinally extending edges of the patient platform 1300. In some embodiments, the frame 1200 contacts and supports substantially the entire edge along at least one longitudinally extending side of the patient platform, or along both longitudinally extending sides of the patient platform.

As shown in the illustrated embodiments, the frame 1200 contacts and supports at least the edges of a central section of the platform 1300 disposed between the upper end 1303 and the lower end 1304 of the platform 1300. In other words, along the longitudinal length of the patient platform 1300, the frame 1200 contacts and supports at least the side edges of a central section that is substantially coincident with the center of mass of the patient (e.g., near the navel or slightly below). The "central section" may be defined as the section of the patient platform 1300 that is at least about 10 inches from the upper end 1303 and at least about 10 inches from the lower end 1304 of the patient platform 1300, or that is at least about 15 inches from the upper end 1303 and at least about 15 inches from the lower end 1304 of the patient platform 1300, or that is at least about 20 inches from the upper end 1303 and at least about 20 inches from the lower end 1304 of the patient platform 1300, or that is at least about 25 inches from the upper end 1303 and at least about 25 inches from the lower end 1304 of the patient platform 1300, or that is at least about 30 inches from the upper end 1303 and at least about 30 inches from the lower end 1304 of the patient platform 1300.

The frame 1200 may also include features to improve transport of the trauma gurney 1000. For example, the frame 1200 may include bumpers 1214 or gliders to prevent damage to the gurney 100 or other objects as the gurney 1000 is maneuvered or transported. The frame 1200 may also include handholds (handholds 1211 near the front and/or handholds 1212 near the rear) for a user to grasp in maneuvering the trauma gurney 100. The illustrated frame 1200 also includes a rail system 1250. The rail system 1250 includes adjustable rails 1251, 1252 that serve to prevent a patient from falling out of the trauma gurney 100 and/or function as another handhold for a user to maneuver the trauma gurney 100.

The rails 1251, 1252 are adjustable in height. In some embodiments, the rails 1251, 1252 may rotate along a series of hinges to fold to a lowered position. In a preferred embodiment, the rails 1251, 1252 mount into sleeves and slide vertically. Rails 1251, 1252 that slide vertically are advantageous because this type of rail system 1250 avoids hazardous moving parts that form pinch points that risk injury to the patient or medical staff.

Figure 11:
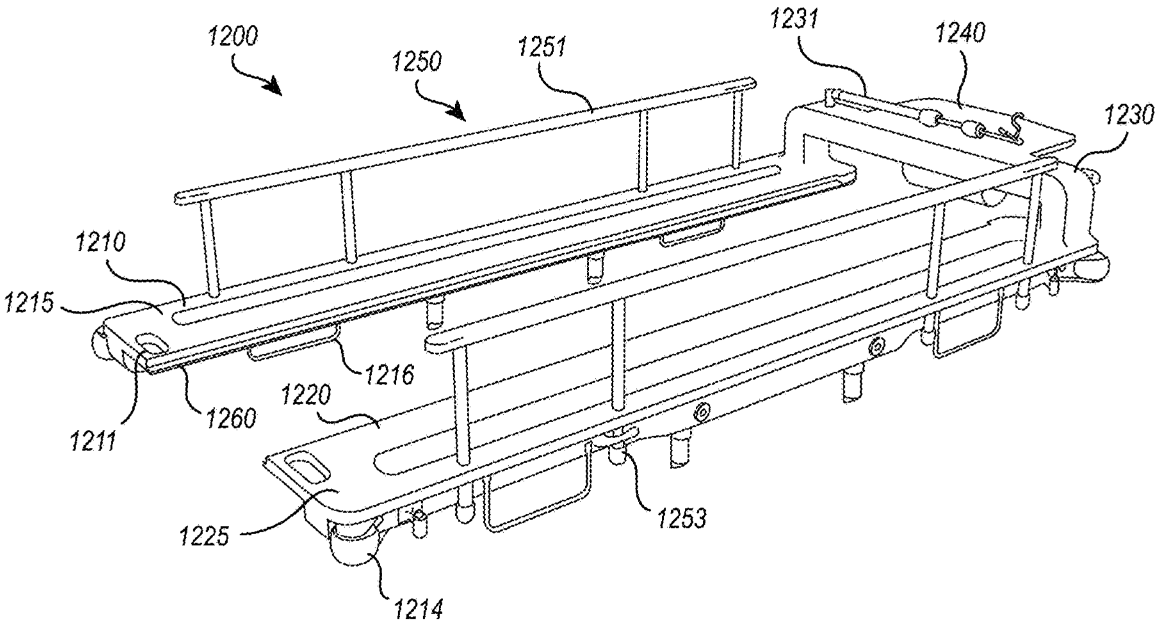
FIGS. 11-12 illustrate a u-shaped frame of a trauma gurney.
Figure 12:
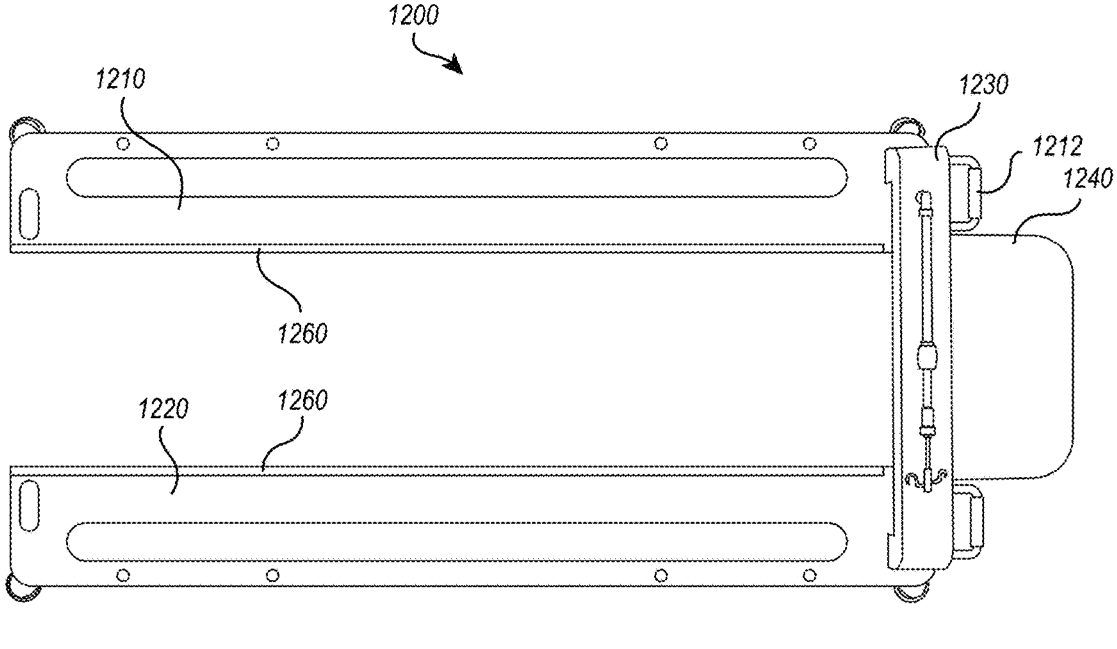

FIG. 11 illustrates the rails 1251, 1252 in a first position where the rails are adjusted vertically upward away from the surface 1215, 1225 of the frame 1200. FIG. 1 illustrates the rails 1251, 1252 in a second position where the rails are adjusted vertically downward near the surface of the frame. In the second position, the rails 1251, 1252 do not obstruct access to the patient platform 1300. With the rails 1251, 1252 lowered, it is easier to position a patient onto (or remove the patient from) the trauma gurney. When the rails 1251, 1252 are in the second position, medical staff has improved access to the patient for treatment and/or other processes.

Referring again to FIG. 11, the illustrated rail system 1250 includes a locking device to secure the rails 1251, 1252 in place after adjustment. In some embodiments, the locking mechanism is a camming device or a ratcheting device that is released to allow movement when a user pulls a lever 1253. However, when the lever 1253 is released, the locking mechanism will engage to prevent further adjustments of the rails 1252, 1252.

An equipment platform 1240 may be attached to the laterally extending portion 1230 for supporting medical equipment. For example, the equipment platform 1240 may be designed to support monitors, supplies, charts, tubes, and/or other hospital equipment. In some embodiments, the equipment platform 1240 includes a faraday cage to protect the equipment from electromagnetic fields emitted by imaging equipment or other medical procedures. Such a faraday cage is beneficial because it enables the trauma gurney 100 to remain in the MRI room with the patient during imaging without interference between the equipment supported on the trauma gurney 1000 and the imaging machine. Standard gurneys must often be removed from the MRI room to avoid potential interference.

The frame 1200 may also include utility hooks or hoops 1216 that can be used for tube management and/or equipment storage (e.g., storing oxygen canisters or patient charts). The frame 1200 may also include a pole 1231 for holding intravenous bags, tubes, or the like. The pole 1231 may be foldable or telescoping for easy storage, the frame 1200 or base 1100 may include other trays, hooks, or storage bins needed to transport objects with the gurney 1000.

The frame 1200 may also include a proportional metering valve as discussed above with regard to the adjustment mechanism 1130. The hydraulic lines 1134 will be included in the frame 1200 to supply and return fluid to the proportioning valve (not illustrated). The proportioning valve assembly (e.g., the proportioning valve and the hydraulic lines 1134) may be disposed internally or externally on the frame 1200.

The frame 1200 may also have a scale for measuring the weight of a patient supported by the patient platform 1300. In one instance, the scale is located in the mating ledge 1260 where the patient platform 1300 is attached to the frame. The scale may also be faraday protected. In this manner, a patient can be weighed without removing the patient from the trauma gurney 1000, which saves time and can enable faster treatment of the patient. For example, stroke patients are often imaged to determine whether the stroke is ischemic or hemorrhagic. If ischemic, the patient is typically treated with tissue-plasminogen activator (TPA). Integrating the scale with the gurney enables medical staff to readily measure the patient weight so as to determine proper TPA dosage (and/or proper dosage of other treatments) without the need to separately transfer the patient to a scale and then back to a transfer gurney.

A method of weighing a patient may include zeroing a scale before the patient is placed on the trauma gurney and then weighing the patient when the patient is first positioned on the gurney. Another method includes zeroing the scale when the patient and the patient platform have been removed from the frame 1200 and transferred to a receiving table. Later, when the patient and the patient platform are transferred back to the trauma gurney 1000 the method includes weighing the patient as connection is reestablished between the patient platform 1300 at the frame 1200. In either method, it may be necessary to account for the weight of the patient platform 1300 in calculating the patient's weight.

Figure 13:
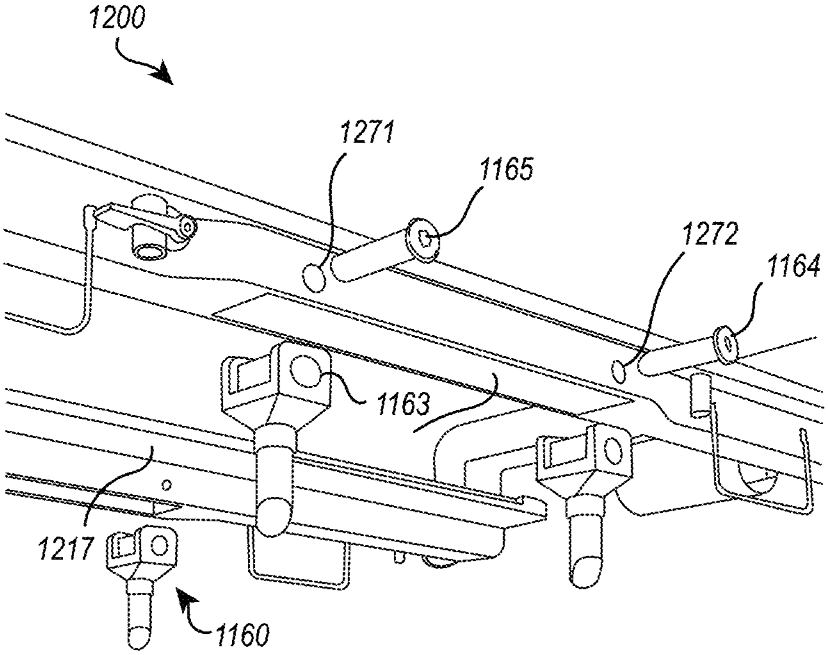
FIGS. 13-14 illustrate an underside of the frame and associated attachment members.
Figure 14:
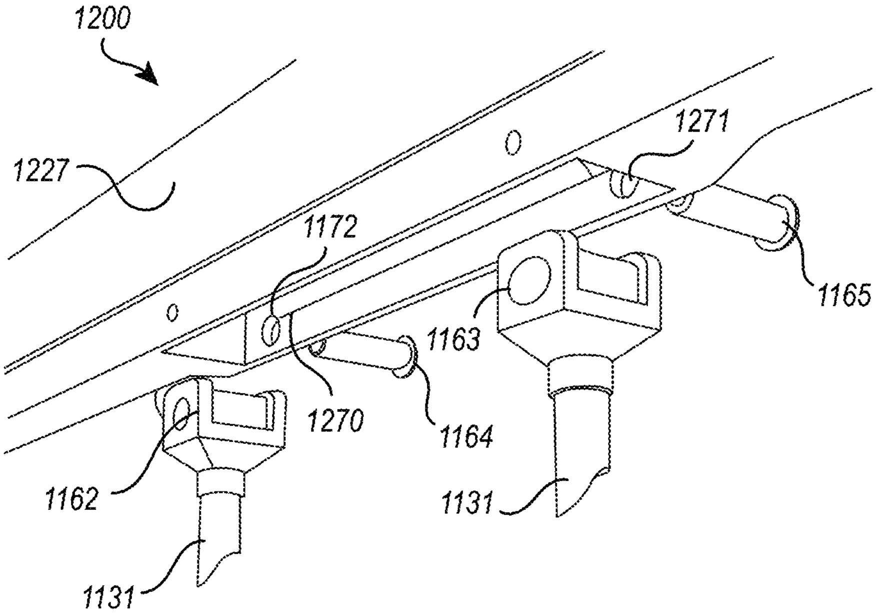

Turning now to FIGS. 13 and 14, the illustrated frame 1200 includes a mounting channel 1270 that is located on the reverse side 1217, 1227 of the frame 1200. The channel 1270 fits around the attachment member 1160 that is connected to the adjustment mechanism 1130 of the base 1100. The channel 1270 may be formed as part of the monolithic structure of the frame 1200. Alternatively, the channel may be welded or bolted to the frame 1200. The attachment member 1160 that fits into the channel 1270 may include multiple devises 1161 as shown in FIGS. 13 and 14. The width of the channel 1270 will correspond with the width of the clevis face such that the devises 1161 can fit into the channel 1270 and the devises 1161 will abut each side of the channel 1270. The channel is machined to fit the devises 1161, but alternatively the fit between the channel 1270 and the devises 1161 may be shimmed or gibbed. The channel may also include multiple bores 1271, 1272 that correspond with the axle bores 1162, 1163 of the devises 1161. Notably, the bore 1271, which corresponds with the elongated clevis bore 1163, is not elongated. To attach the frame 1200 to the base 1100, the devises 1161 are inserted into the channel 1270 and an axle 1164, 1165 is fed through both the channel bores 1271, 1272 and the axle bores 1162, 1163.

Additional Patient Platform Details

Discussion will now be turned to the various components of the patient platform 1300 shown in FIGS. 15-19. The patient platform 1300 generally corresponds to the patient platform 130 of FIGS. 1-7, and the following features may be included in patient platform 130. The patient platform 1300 is designed to disconnect from the trauma gurney 100 and be left with the patient during a procedure, such as imaging. Thus, the patient platform 1300 is designed to interfere minimally with various procedures that the patient may undergo because the platform will be present with the patient during the imaging In one embodiment, the patient platform 1300 will be constructed from non-magnetic and non-interfering materials that are radio transparent. In another embodiment, the patient platform 1300 has a flat surface so that a view of the patient is unobstructed during imaging. This feature is beneficial in order to prevent the patient platform 1300 from leaving artifacts on the imaging.

Figure 15:
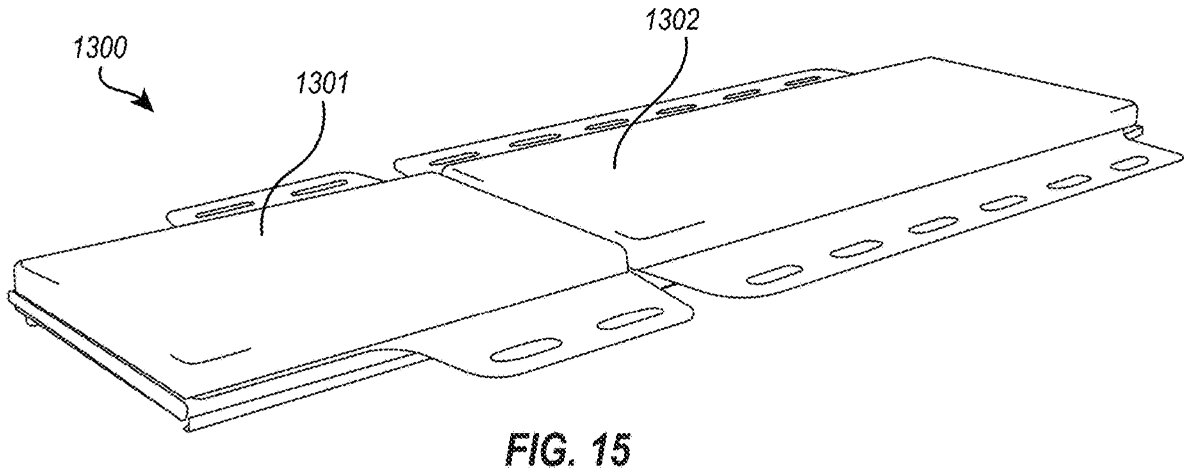
FIG. 15 illustrates a patient platform.
Figure 16:
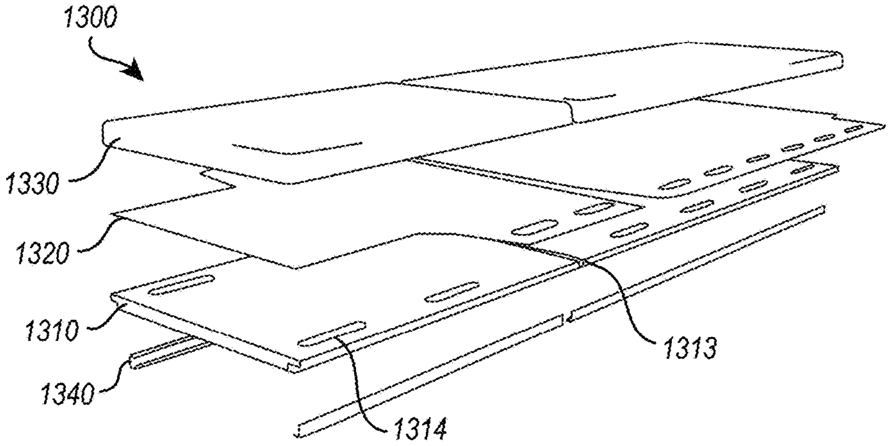
FIG. 16 illustrates an exploded view of the patient platform.

FIG. 15 illustrates the patient platform 1300 and FIG. 16 illustrates an exploded view of the patient platform 1300. The illustrated patient platform includes a patient support 1310, a shield 1320, a pad 1330, and tracks 1340 (i.e., legs or rails). The patient platform 1300 is supported by the arms 1210, 1220 of the frame 1200 along the longitudinally-extending, side edges of the patient support 1310.

The illustrated patient platform 1300 has two portions 1301, 1302. The upper portion 1301 is the portion of the platform that generally supports the patient's head and chest and is disposed furthest away from the laterally extending portion 1230 of the frame 1200. The lower portion 1302 is the portion of the platform that generally supports the patient's legs and feet and is positioned closest to the laterally extending portion 1230 of the frame 1200. The positioning of the upper and lower portions 1301, 1302 with regard to the laterally extending portion 1230 can be seen in FIG. 1.

The patient platform 1300 includes a pad 1330. The pad 1330 is a cushioning device to improve the patient's comfort while positioned on the trauma gurney 100. The pad 1330 may be a standard gurney pad. Alternatively, the pad 1330 may be made of a closed cell urethane casting. Preferably, the pad 1330 will be thinner than a standard gurney pad to improve the quality of imaging that can be obtained while the patient is positioned on the platform 1300. The pad 1330 is configured to bend between the upper and lower portions 1301, 1302 of the patient platform 1300. The pad 1330 will include features to enable the bend, such as a hinge, crease, flexible section, or the like.

The patient support 1310 is a rigid support that is designed to carry the weight of the patient. The patient support 1310 includes handholds 1314 which can be used by a user to position the support 1310. The patient support is constructed as thin as possible to improve the quality of imaging that can be obtained while the patient is positioned on the platform 1300. The patient support 1310 may be constructed from radiolucent and noninterfering materials such as carbon fiber, Kevlar, fiber reinforced polymers, or the like. The patient support 1310 may include a shroud constructed of bonded polyethylene. The shroud may include mechanical connectors constructed from aluminum fasteners.

Figure 17:
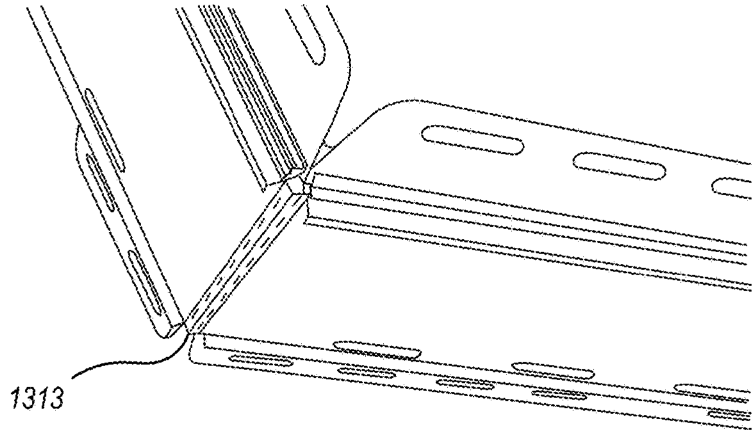
FIG. 17 illustrates the reverse side of the patient platform that includes a hinge.

As shown in FIG. 17, the illustrated patient support 1310 includes a hinge 1313 at the junction of the upper and lower portions 1301, 1302. The hinge 1313 and the hinge pin may be constructed from radiolucent materials. For example, the hinge 1313 and hinge pin may be glass-reinforced nylon. Alternatively, the hinge 1313 for the patient support 1310 can be constructed from glass-filled nylons and hinge pin may constructed from a stainless steel.

The hinge 1313 is generally located at the waist or hip area of the patient. The upper portion 1301 may have a smaller longitudinal length than the lower portion 1302. The hinge 1313 may be a range-limiting hinge such that it is only possible to bend the patient support 1310 within a predetermined range. For example, the range-limiting hinge 1313 may allow the patient support 1310 to bend to angles less than about 90°. In this manner, the upper portion 1301 can be raised such that the patient is supported in a sitting position. On the other hand, the hinge 1313 will not allow the patient support 1310 to bend to an angle greater than a flat horizontal position. In another embodiment, the range-limiting hinge 1313 may only allow for angles between about 0° to about 90°.

A support assembly, located on either the patient support 1310 or the frame 1200 may be provided to support the patient platform 1300 in the sitting position. In one embodiment, the support assembly folds out from the reverse side of the patient platform 1300 and locks into grooves provided in the frame 1200. Alternatively, the support assembly folds out from the frame 1200 and locks into grooves provided in the reverse side of the patient platform 1300.

The patient support 1310 also includes a mating channel 1311 (i.e., mating ledges). The mating channel 1311 is located along the perimeter edge of the patient support 1310. In one embodiment, the mating channel 1311 is located on the longitudinally extending edges of the patient support 1310. In other words, the mating channel 1311 is located on the two longest edges of the patient support 1310 that correspond with the arms 1210, 1220 of the frame 1200. In another embodiment the mating channel 1311 is located on two longitudinally extending edges and one laterally extending edge that correspond with the arms 1210, 1220 and the laterally extending portion 1230 of the frame 1200.

Figure 18:
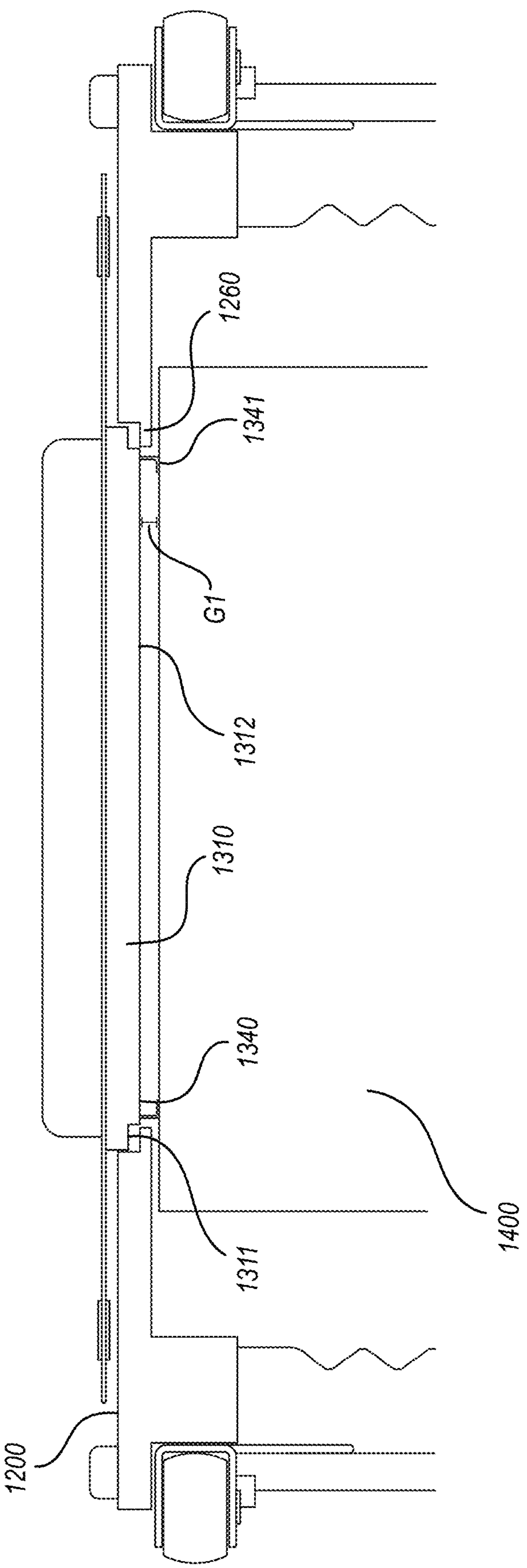
FIG. 18 illustrates the patient platform as supported by the frame and showing associated components.

The mating channel 1311 is designed to engage with the mating ledge 1260 of the frame 1200. This is shown in FIG. 18. In some instances, the thickness of the mating ledge 1260 is smaller than the thickness of the frame 1200. In this manner, the patient support 1310 is flush with the frame 1200 when it is attached to the frame 1200. The patient support 1310 and the frame 1200 may be flush on the support surface (e.g., a surface where the patient is positioned), the reverse surface (e.g., the surface opposite the support surface), or both. The mating ledge 1260 is configured to contact and support the patient support 1310. Additionally, or alternatively, the mating ledge 1260 and the mating channel 1311 may attach with interlocking edges, serrations, friction materials, or the like.

As shown in FIG. 18, the patient platform 1300 may also include tracks 1340. The tracks 1340 are disposed on the reverse side 1312 of the patient support 1310 and extend along the longitudinally extending side edge of the patient support 1310. In this embodiment, the tracks function as "legs" that hold up the patient support 1310 when the patient support 1310 is positioned on a receiving table 1400. The tracks 1340 also allow medical personnel to position an imaging device (i.e., an x-ray cassette) and/or other equipment underneath the patient support 1310. In other words, when the patient support 1310 is resting on a receiving table 1400, the tracks 1340 create a gap G1 between the patient support 1310 and the surface of the receiving table 1400. An imaging device can slide through the gap G1 into position under the patient and between the patient support 1310 and the receiving table 1400. In this embodiment, the tracks are L-shaped and include a foot portion 1341 that rests on the receiving table 1400. The foot portion 1341 is beneficial because it enables the tracks 1340 to maintain hold of an imaging device or cassette when the patient support 1310 is lifted off the table 1400 and suspended in the frame 1200 of the trauma gurney 100. Positioning an imaging device such as an x-ray cassette in this manner also beneficially decreases the object-to-image distance (OID) compared to a typical arrangement, which enables more effective imaging of the patient.

The tracks 1340 also ease the disengagement and re-engagement of the patient support 1310 from the frame 1200. The mating ledge 1260 on the frame 1200 has a thickness which is thinner than the gap G1 provided between the patient support 1310 and the receiving table 1400. In other words, the height of the tracks 1340 is equal to the distance G1, which is greater than the thickness of the mating ledge 1260. Thus, when the patient platform 1300 rests on a planar surface (e.g., the receiving table 1400), the frame 1200 can be disengaged from the patient platform 1300 by lowering the height of the frame 1200 so that the mating ledge 1260 is not in contact with the patient support 1310 or the receiving table 1400. In some embodiments the height of the tracks 1340 and the gap G1 is also greater than the thickness of the frame 1200. The tracks 1340 also enable the frame 1200 to re-engage with the patient support 1310. The gap G1 provides a space for the mating ledge 1260 to maneuver under the patient support 1310, and the frame 1200 can then move upward to reestablish contact between the patient platform 1300 and the frame 1200.

Figure 19:
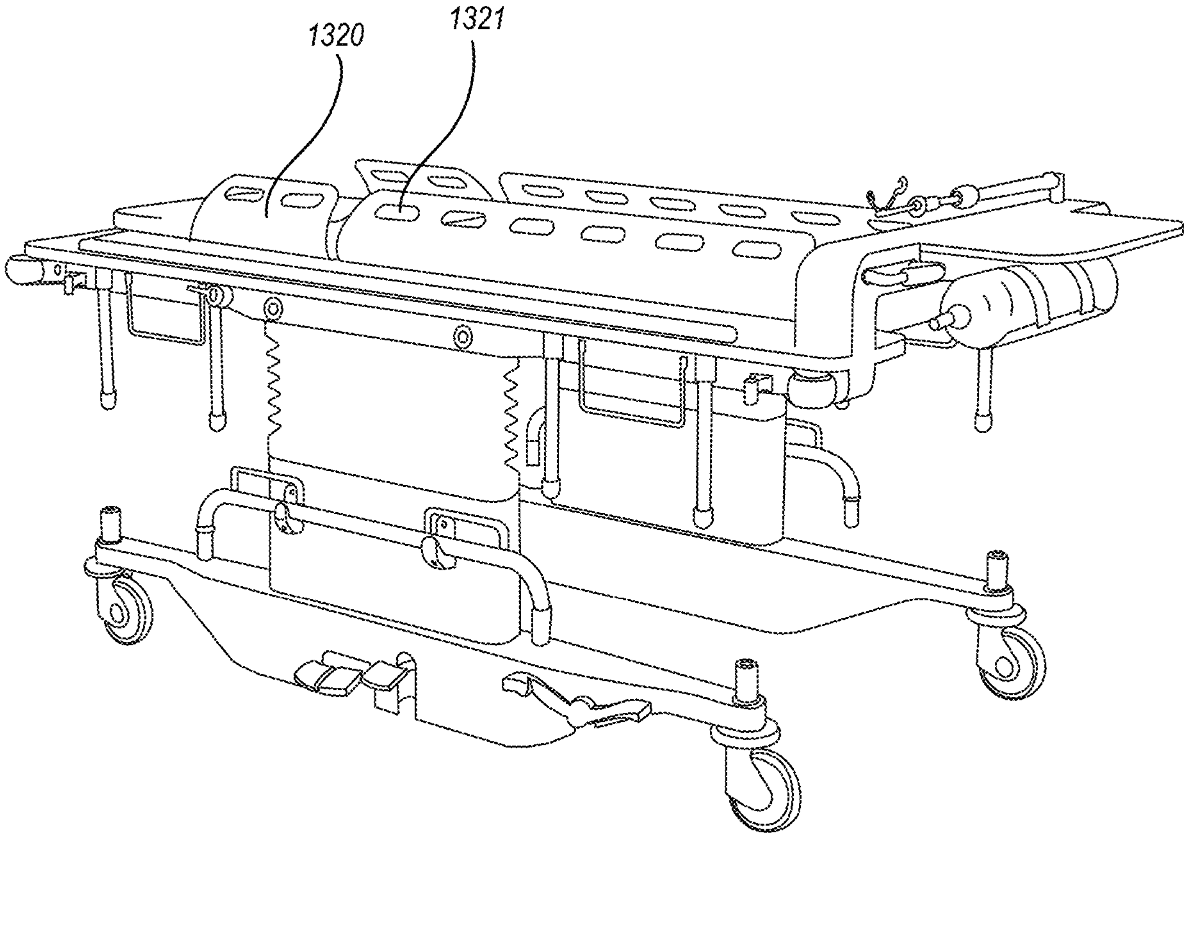
FIG. 19 illustrates a patient platform with a foldable shield.

As shown in FIG. 19, the illustrated patient platform also includes a shield 1320 which is typically positioned between the patient support 1310 and the pad 1330. The shield 1320 is a separation barrier between the patient and a contact point of the patient support 1310 and the frame 1200. Thus, the patient is protected from being injured in the pinch point between the frame 1200 and patient platform 1300. The shield 1320 has a width that is greater than the bed width of the patient platform 1300.

The shield 1320 can be folded around the patient to help with tube or device management and/or to prevent the patient from being pinched. The illustrated shield 1320 also includes handholds 1321 which can be used to position/adjust the patient on the trauma gurney 1000 or the receiving table 1400. The handholds 1321 may also be used to lift the patient if necessary. The handholds 1321 also provide an additional benefit of providing a place for bundling bedding and patient extremities to prevent interference with the imaging tools. The shield may be constructed from non-magnetic and non-interfering materials. For example, the shield may be constructed from polyethylene or the like.

Trauma Gurney Functionality

Discussion will now be turned to the various capabilities of the trauma gurney 1000 and methods that may be used with the trauma gurney 100. FIGS. 23-29 illustrate non-limiting examples of the various capabilities and methods that may be employed with trauma gurney 1000.

Figure 20A:
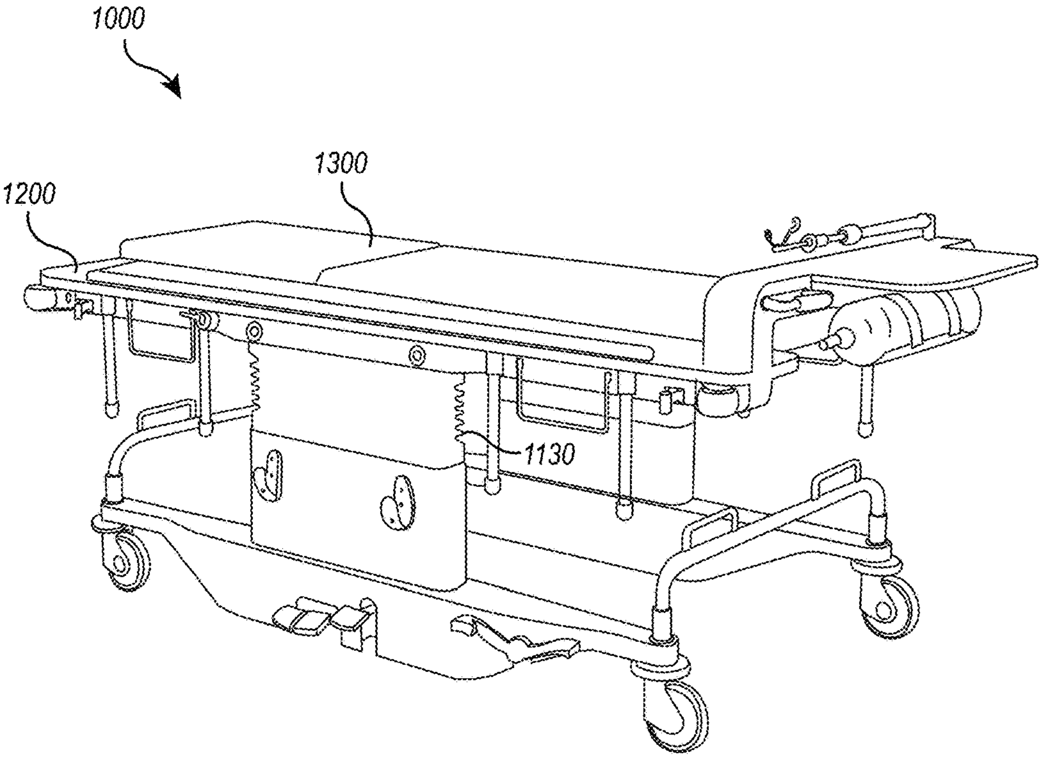
FIGS. 20A and 20B illustrate the adjusting functions of the trauma gurney to adjust the height of the frame up and down.
Figure 20B:
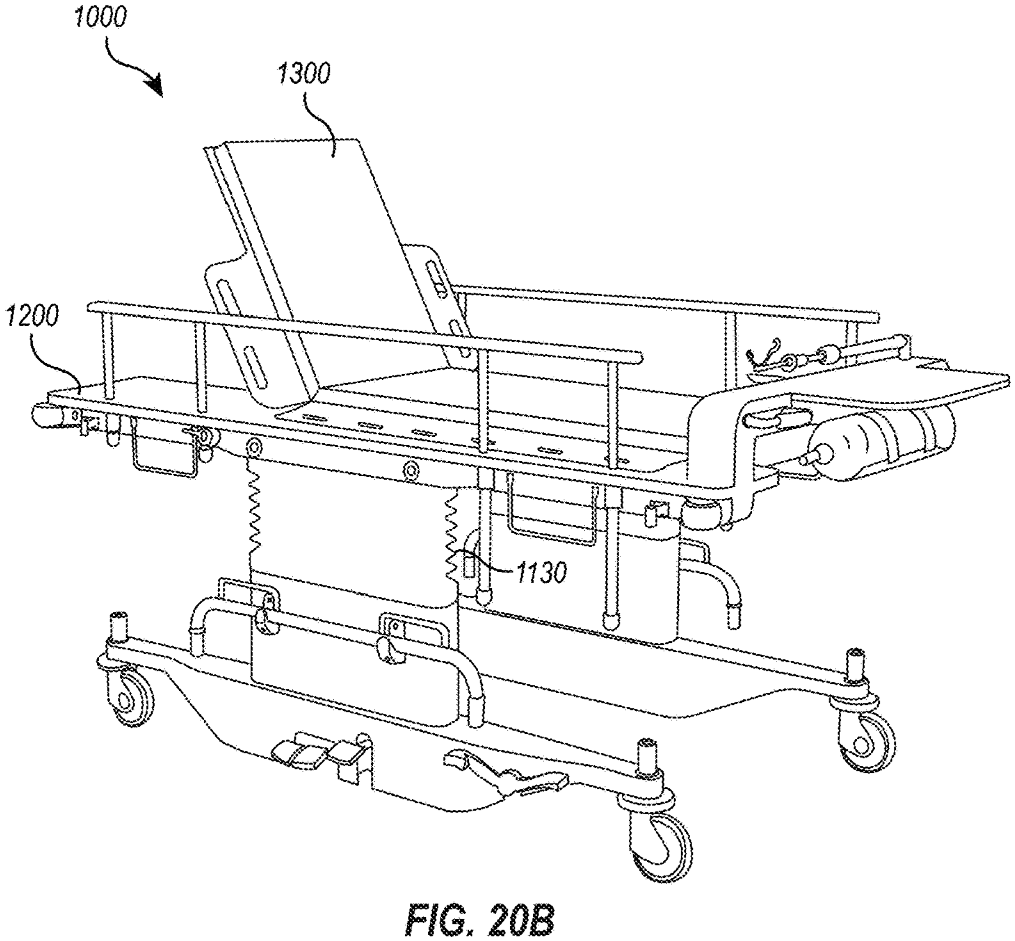

FIGS. 20A and 20B illustrate that the trauma gurney 1000 is adjustable in height. FIG. 20A illustrates the frame 1200 lowered to its minimum height. FIG. 20B illustrates the frame 1200 raised to its maximum height. FIG. 20A also illustrated the rails 1251, 1252 in a lowered position and FIG. 20B illustrates the rails 1251, 1252 in a raised position. Also, FIG. 20A illustrates the patient platform 1300 in a flat position, and FIG. 20B illustrates the patient platform 1300 in a bent, upright position.

Figure 21A:
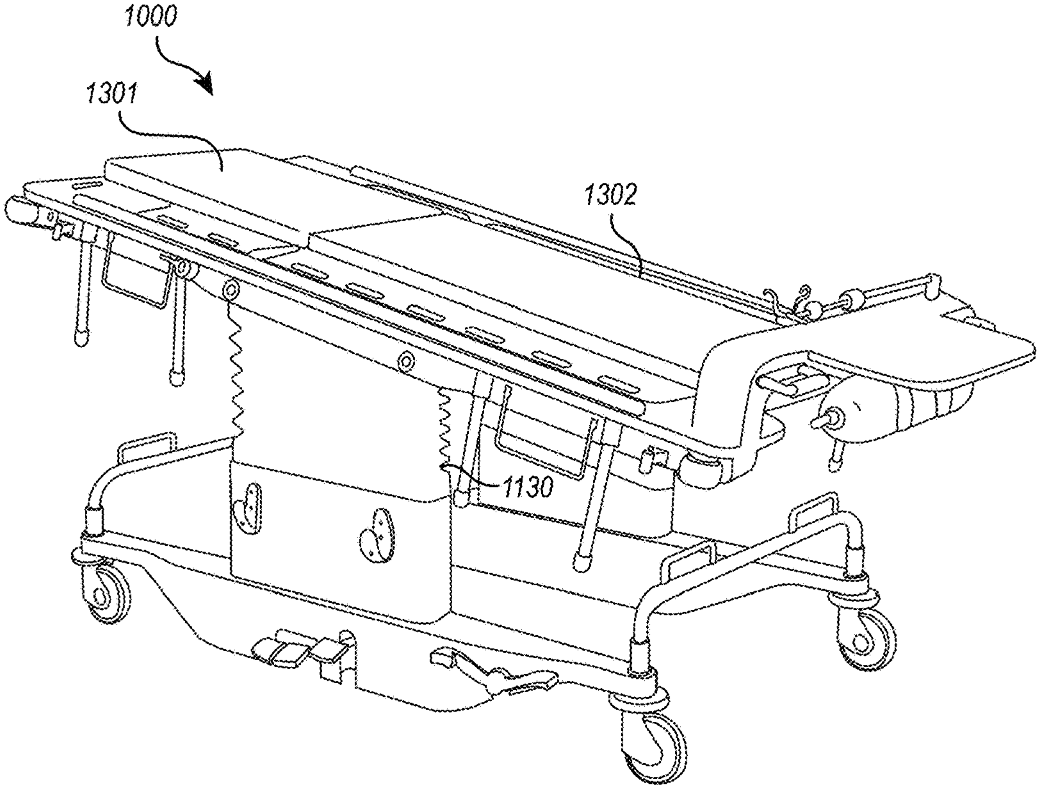
FIGS. 21A and 21B illustrate the tilting function of the trauma gurney to tilt the frame.
Figure 21B:
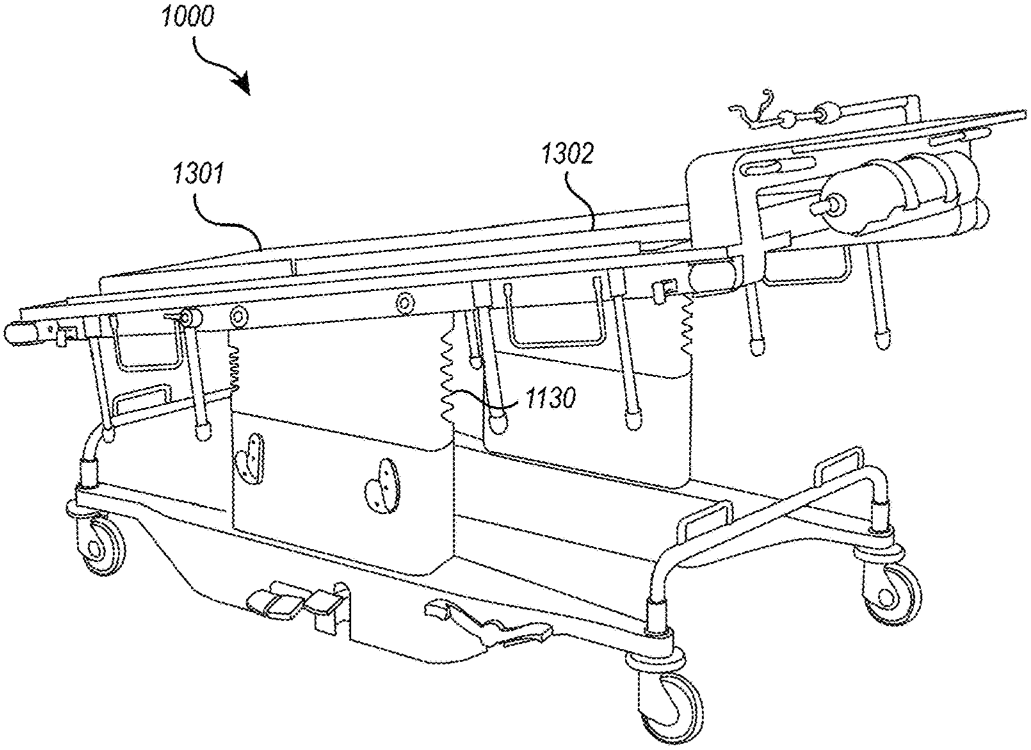

FIGS. 21A and 21B illustrate that the trauma gurney can be adjusted in a tilt. FIG. 21A illustrates the trauma gurney 1000 in a reverse Trendelenburg position such that the upper portion 1301 is adjusted to a height that is greater than the height of the lower portion 1302. FIG. 21B illustrates the trauma gurney 100 in a Trendelenburg position such that the upper portion 1301 is adjusted to a height that is less than the height of the lower portion 1302. In other words, that patient's feet would be elevated above the patient's head. In other words, that patient's feet would be elevated above the patient's head. Often, the platform is positioned at about 15° up to about 30° or 40° from horizontal when in the Trendelenburg or reverse Trendelenburg position.

The range of rotation may be limited to prevent damage to the components of the adjustment mechanism, or to prevent the trauma gurney 1000 from being inadvertently adjusted to a position which causes the patient to fall out of the trauma gurney 1000. In some instances, the range of rotation may be about +/−25° from horizontal, but more preferably +/−20° from horizontal or about +/−15° from horizontal.

Example Methods of Use

Discussion will now be turned to methods and steps that may be used to transfer a patient to a receiving table 1400 with the trauma gurney 1000. Although the illustrated embodiments are described using a particular sequence of steps, it will be understood that certain steps may be performed in a different order so long as the overall function of positioning the patient platform on a receiving table and detaching it from the frame remain possible.

Figure 22A:
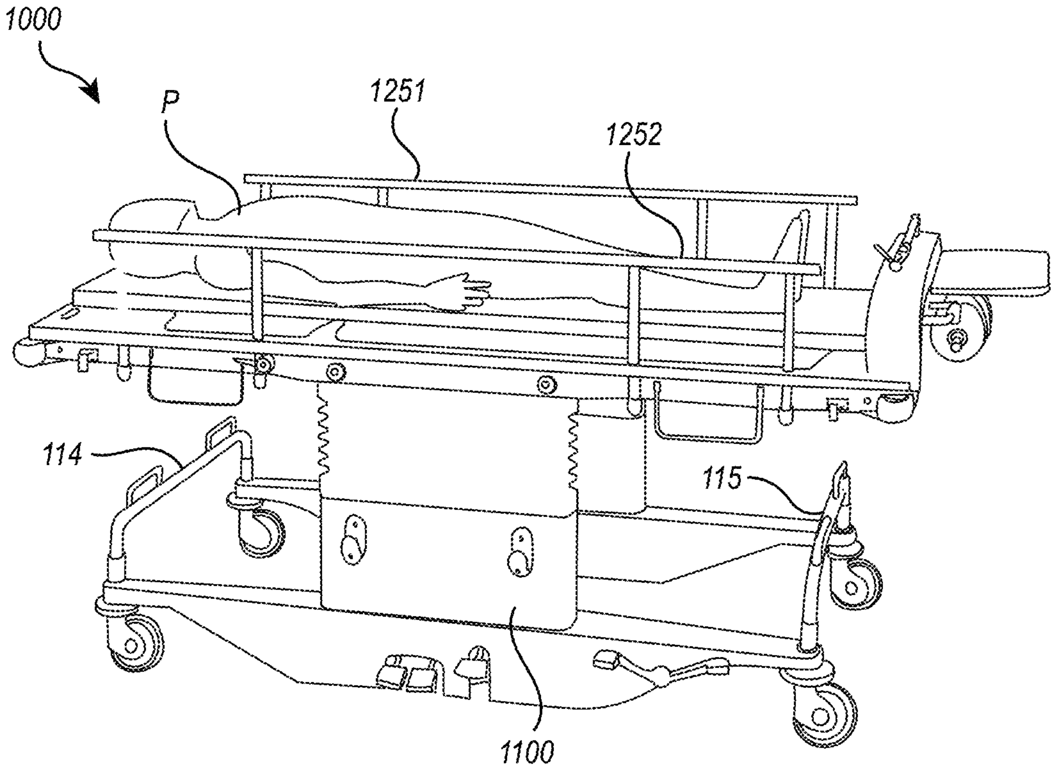
FIG. 22A-22G illustrate a transfer of a patient from the trauma gurney to a receiving table.

FIGS. 22A-22G illustrate the trauma gurney 1000 at various steps of transferring a patient to a receiving table 1400. FIG. 23 illustrates a method 2900 that may be used to transfer the patient from the trauma gurney 1000 to a receiving table 1400. FIG. 22A illustrates a patient P positioned on the trauma gurney 1000 (Step S1) as it is being transported to the receiving table (Step S2). During transport, the rails 1251, 1252 may be raised, and the lateral base members 114, 115 (if utilized) may be attached such that each lateral base member 114, 115 is connected to each of the base members 1110, 1120.

Figure 22B:
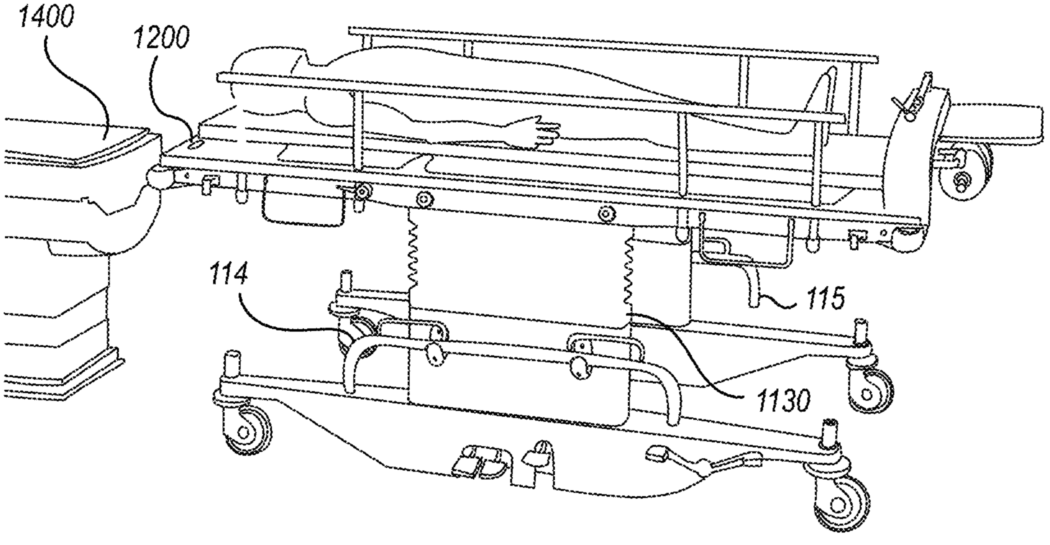
Figure 23:
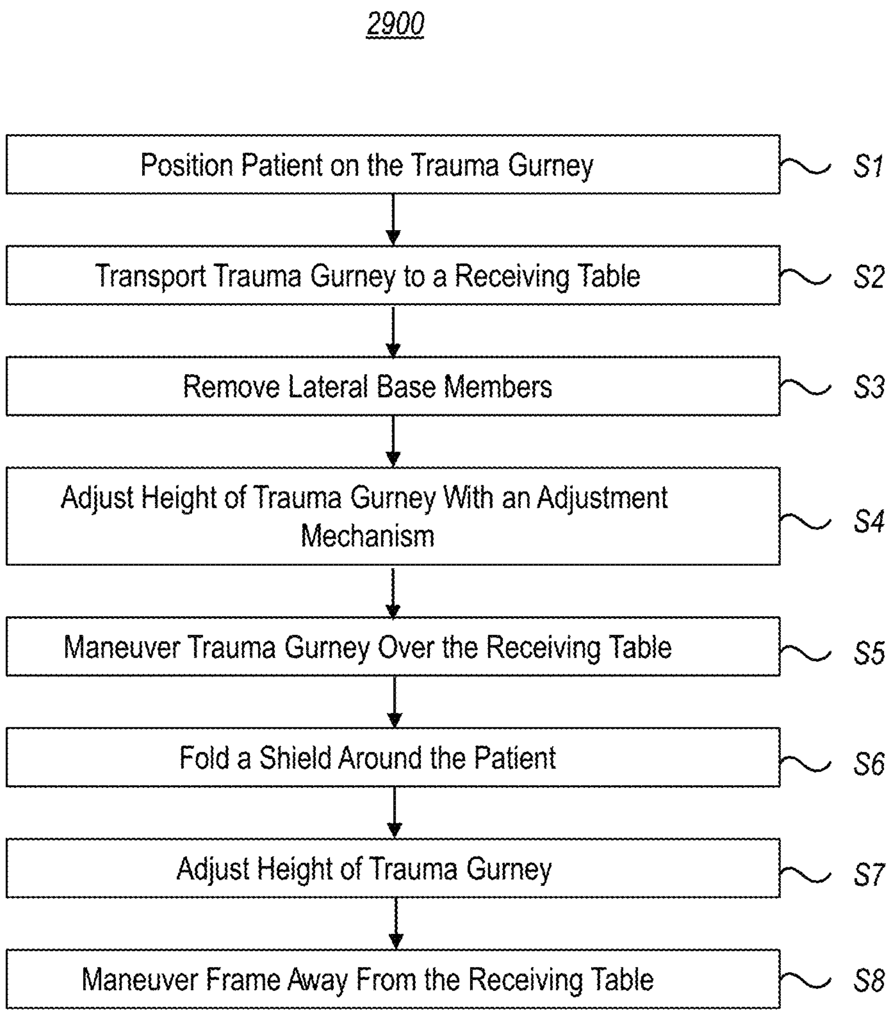
FIG. 23 illustrates a method of transferring a patient to a receiving table with a trauma gurney.

Once the trauma gurney is near the receiving table 1400, as illustrated in FIG. 22B, the lateral base members 114, 115 are removed (step S3). Thus, with the lateral base members 114, 115 removed, the trauma gurney can be moved over the receiving table 1400 unobstructed. In some implementations, lateral base members 114, 115 are omitted and thus their removal is not necessary.

Figure 22C:
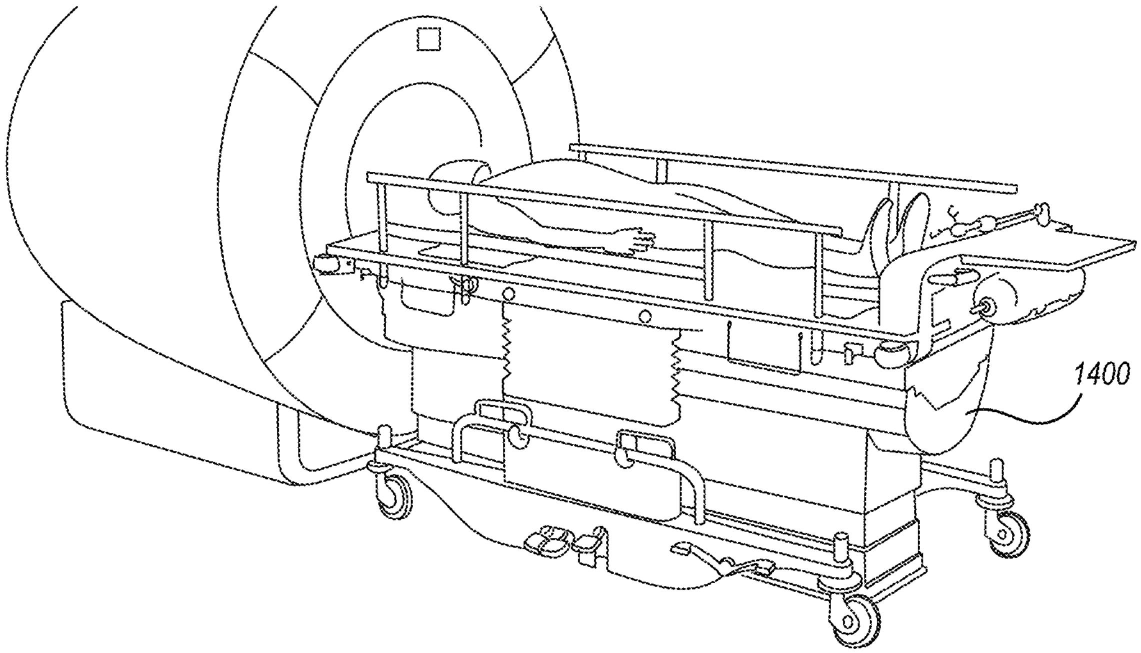
Figure 22D:
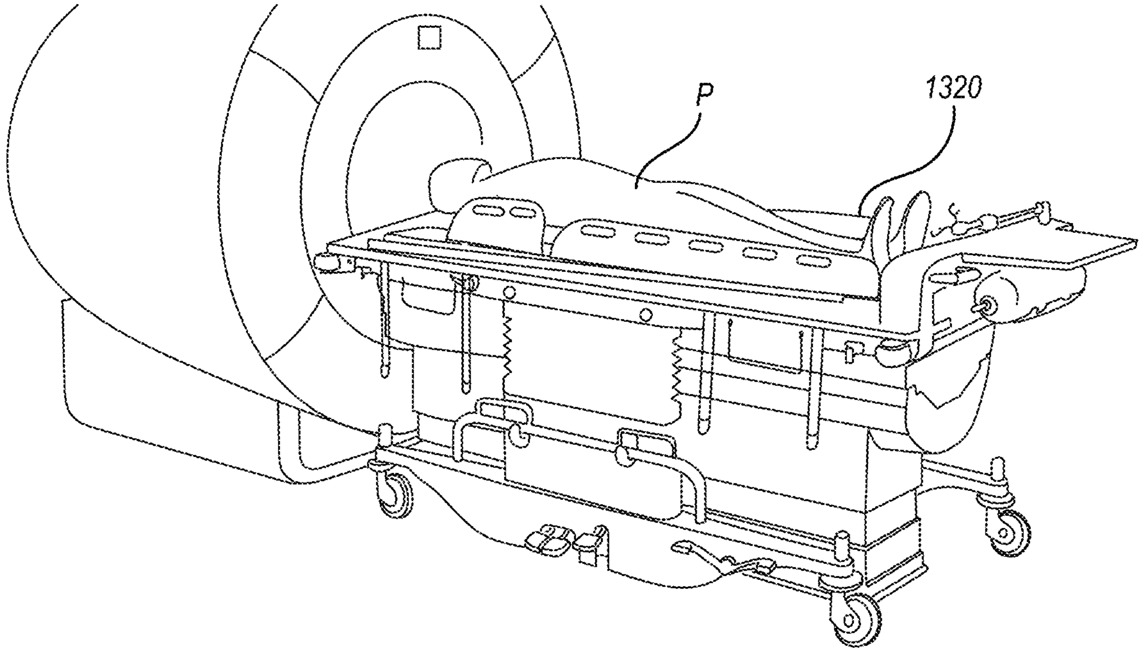

The illustrated method also includes the step of adjusting the height of the trauma gurney so that the height of the trauma gurney 1000 is greater than the height of the receiving table 1400 (step S4) if this is not the case already. The trauma gurney 1000 is then maneuvered over the receiving table 1400 (step S5) as illustrated in FIG. 22C. The shield 1320 may then be folded around the patient P, as illustrated in FIG. 22D (step S6). The folded shield 1320 can help protect the patient P from the frame 1200, for example, as the frame 1200 is lowered and moved away from the patient P. The shield may also be useful for tube management during the transfer and/or other use of the gurney.

Figure 22E:
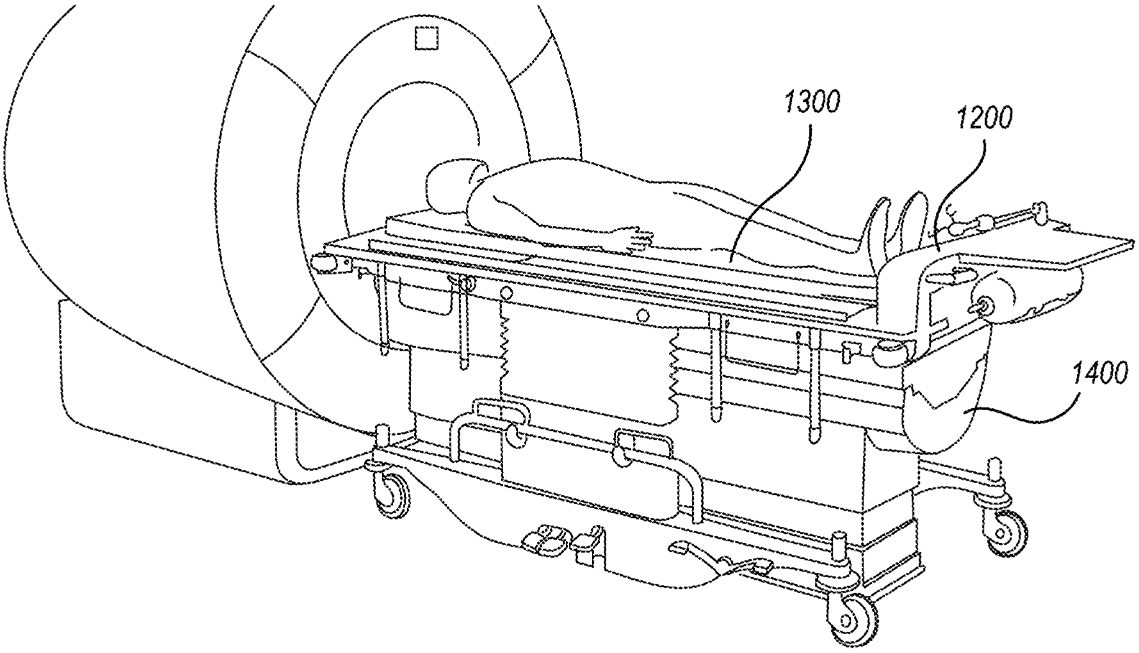

The height of the frame 1200 is then lowered (by way of the adjustment mechanism 1130) such that the patient platform 1300 comes in contact with the receiving table 1400 and detaches from the frame, as shown in FIG. 22E (step S7). The new, lowered height of the frame 1200 must be low enough to detach the patient platform 1300 from the frame 1200, but high enough that the frame 1200 does not come in contact with the receiving table 1400. In this manner, the frame 1200 can be maneuvered away from the receiving table, leaving the patient P and the patient platform 1300 behind.

Figure 22F:
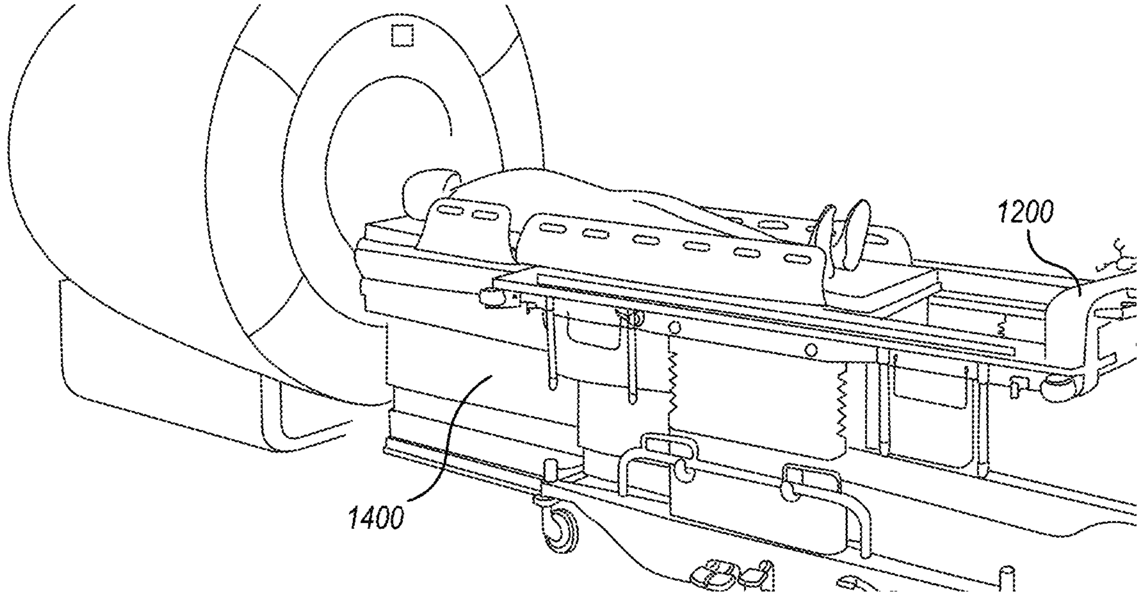
Figure 22G:
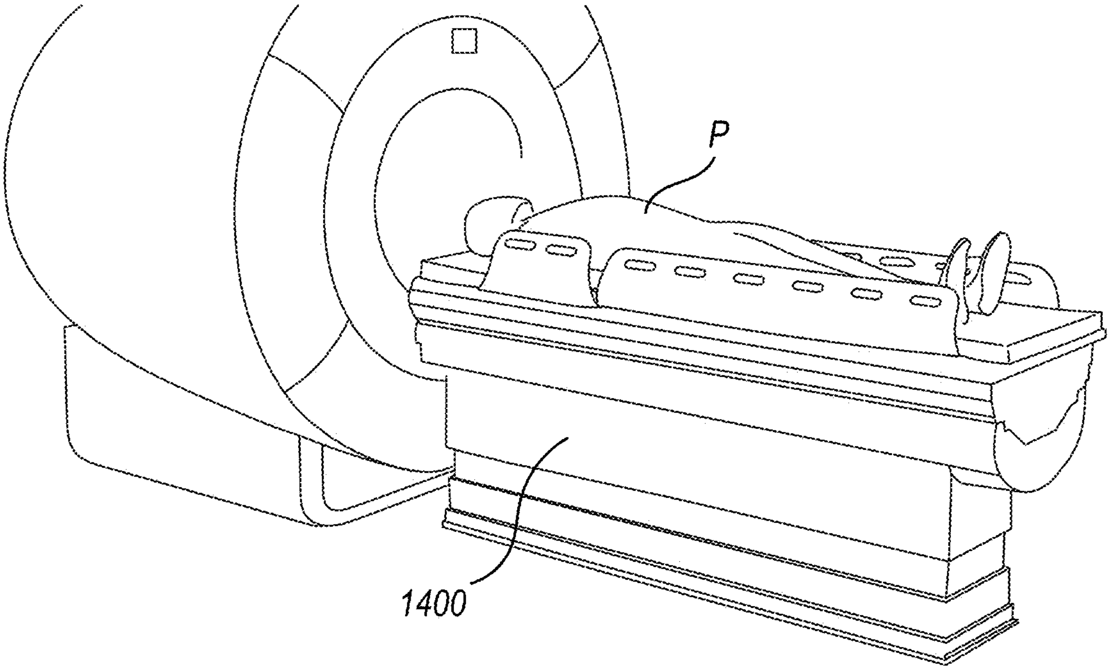

FIG. 22F illustrates the frame 1200 being moved away from the receiving table 1400 such that the patient platform 1300 remains on the receiving table 1400 (step S8). FIG. 22G illustrates the patient P successfully transferred to the receiving table 1400.

The patient P can then be transferred back to the trauma gurney 1000 by essentially reversing the foregoing steps. In an example implementation, the trauma gurney 1000 will be brought back to the receiving table 1400 where the patient P is positioned. The shield 1320 may be folded toward to the patient P to protect the patient from the moving parts of the trauma gurney 1000. The height of the frame 1200 will be adjusted to a height that is lower than the patient platform 1300 but higher than the receiving table 1400. The frame 1200 will then be moved over the receiving table 1400 and under the patient platform 1300. The height of the frame will be adjusted upward such that the mating ledge 1260 and the mating channel 1311 contact each other and the patient platform 1300 is supported by the frame 1200. The height of the frame 1200 will be adjusted to a height which is greater than the height of the receiving table 1400. The trauma gurney 1000 will then be moved away from the receiving table 1400, and each of the lateral base members 114, 115 (if utilized) will be attached to each of the base member 1110, 1120.

Additional Terms & Definitions

While certain embodiments of the present disclosure have been described in detail, with reference to specific configurations, parameters, components, elements, etcetera, the descriptions are illustrative and are not to be construed as limiting the scope of the claimed invention. Furthermore, it should be understood that for any given element of component of a described embodiment, any of the possible alternatives listed for that element or component may generally be used individually or in combination with one another, unless implicitly or explicitly stated otherwise.

In addition, unless otherwise indicated, numbers expressing quantities, constituents, distances, or other measurements used in the specification and claims are to be understood as optionally being modified by the term "about" or its synonyms. When the terms "about," "approximately," "substantially," or the like are used in conjunction with a stated amount, value, or condition, it may be taken to mean an amount, value or condition that deviates by less than 20%, less than 10%, less than 5%, or less than 1% of the stated amount, value, or condition. At the very least, and not as an attempt to limit the application of the doctrine of equivalents to the scope of the claims, each numerical parameter should be construed in light of the number of reported significant digits and by applying ordinary rounding techniques.

Any headings and subheadings used herein are for organizational purposes only and are not meant to be used to limit the scope of the description or the claims.

It will also be noted that, as used in this specification and the appended claims, the singular forms "a," "an" and "the" do not exclude plural referents unless the context clearly dictates otherwise. Thus, for example, an embodiment referencing a singular referent (e.g., "widget") may also include two or more such referents.

It will also be appreciated that embodiments described herein may include properties, features (e.g., ingredients, components, members, elements, parts, and/or portions) described in other embodiments described herein. Accordingly, the various features of a given embodiment can be combined with and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include such features.

The invention claimed is:

1. A gurney configured to enable patient transfer without requiring lateral transfer, comprising:

a base connected to a frame by way of an adjustment mechanism, the adjustment mechanism being configured to adjust a height of the frame relative to the base; and a patient platform detachably supported by the frame and configured to detach from the frame, the patient platform having an upper end, a lower end, and a longitudinal length therebetween, wherein the frame comprises longitudinally extending arms that are laterally spaced apart from one another and are configured to support the patient platform therebetween, wherein the frame contacts and supports a central section of the patient platform disposed between the upper end and lower end of the patient platform, and wherein the frame contacts and supports substantially an entire edge along at least one side of the patient platform.

2. The gurney of claim 1, wherein the frame contacts and supports the central section of the platform such that a center of mass of a patient lying thereon is directly supported by the frame.

3. The gurney of claim 1, wherein the frame contacts and supports a perimeter edge of a first longitudinally extending side of the patient platform and a perimeter edge of a second longitudinally extending side of the patient platform.

4. The gurney of claim 1, wherein the frame does not obstruct the upper end of the patient platform.

5. The gurney of claim 1, wherein the base includes two opposing, longitudinally extending base members that are laterally spaced apart from one another.

6. The gurney of claim 5, wherein a span between the two opposing base members is at least about 20 inches.

7. The gurney of claim 5, wherein the adjustment mechanism attaches to each base member.

8. The gurney of claim 1, wherein the gurney is constructed of non-ferrous materials and is compatible in an MRI environment.

9. The gurney of claim 1, wherein the frame includes a scale for weighing a patient.

10. The gurney of claim 1, wherein an upper support surface of the patient platform is substantially horizontally flush with upper surfaces of the arms of the frame.

11. The gurney of claim 1, wherein the patient platform includes opposing tracks disposed on a reverse side of the patient platform, the tracks being spaced apart so as to fit an x-ray cassette therebetween.

12. The gurney of claim 1, wherein the frame is adjustable into a reverse Trendelenburg position or into a Trendelenburg position.

13. The gurney of claim 1, wherein the arms of the frame include mating ledges that allow a bottom surface of the patient platform to sink below an upper surface of the arms of the frame.

14. A gurney configured to enable patient transfer without requiring lateral transfer, comprising:

a base connected to a frame by way of an adjustment mechanism, the adjustment mechanism being configured to adjust a height of the frame relative to the base; and a patient platform detachably supported by the frame and configured to detach from the frame, the patient platform having an upper end, a lower end, and a longitudinal length therebetween, wherein the frame includes arms that support the patient platform, wherein a first arm extends along and contacts an entire perimeter edge of a first longitudinally extending side of the patient platform and wherein a second arm extends along and contacts an entire perimeter edge of a second longitudinally extending side of the patient platform.

15. The gurney of claim 14, wherein an upper support surface of the patient platform is substantially horizontally flush with upper surfaces of the arms of the frame.

16. The gurney of claim 14, wherein the frame contacts and supports a central section of the patient platform disposed between the upper end and lower end of the patient platform, and wherein the frame contacts and supports the central section of the platform such that a center of mass of a patient lying thereon is directly supported by the frame.

17. The gurney of claim 14, wherein the frame does not obstruct the upper end of the patient platform.

18. The gurney of claim 14, wherein the base includes two opposing, longitudinally extending base members that are laterally spaced apart from one another.

19. The gurney of claim 14, wherein the patient platform includes opposing tracks disposed on a reverse side of the patient platform, the tracks being spaced apart so as to fit an x-ray cassette therebetween.

20. The gurney of claim 14, wherein the frame is adjustable into a reverse Trendelenburg position or into a Trendelenburg position.

* * * * *